(12) United States Patent
Tomita

(10) Patent No.: US 8,803,946 B2
(45) Date of Patent: Aug. 12, 2014

(54) IMAGE SIGNAL PROCESSING DEVICE, METHOD AND PROJECTING DEVICE FOR STEREOSCOPIC IMAGES

(75) Inventor: Hideo Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 607 days.

(21) Appl. No.: 12/622,489

(22) Filed: Nov. 20, 2009

(65) Prior Publication Data

US 2010/0128106 A1  May 27, 2010

(30) Foreign Application Priority Data

Nov. 21, 2008  (JP) ................ P2008-297712

(51) Int. Cl.
*H04N 13/00* (2006.01)
*H04N 13/02* (2006.01)
*H04N 13/04* (2006.01)
*H04N 1/387* (2006.01)
*H04N 5/262* (2006.01)

(52) U.S. Cl.
CPC ....... *H04N 13/0246* (2013.01); *H04N 13/0055* (2013.01); *H04N 1/3877* (2013.01); *H04N 5/2628* (2013.01); *H04N 13/0493* (2013.01)
USPC .......................................... 348/43

(58) Field of Classification Search
None
See application file for complete search history.

(56) References Cited

U.S. PATENT DOCUMENTS

| | | | |
|---|---|---|---|
| 5,995,759 A * | 11/1999 | Kohayakawa | 396/18 |
| 6,496,598 B1 * | 12/2002 | Harman | 382/154 |
| 7,538,876 B2 * | 5/2009 | Hewitt et al. | 356/364 |
| 7,705,935 B2 * | 4/2010 | Gaudreau | 349/96 |
| 8,411,134 B2 * | 4/2013 | Tomita | 348/43 |
| 2003/0152264 A1 * | 8/2003 | Perkins | 382/154 |
| 2003/0198398 A1 * | 10/2003 | Guan et al. | 382/255 |
| 2004/0145655 A1 * | 7/2004 | Tomita | 348/51 |
| 2007/0285663 A1 * | 12/2007 | Hewitt et al. | 356/399 |

(Continued)

FOREIGN PATENT DOCUMENTS

| | | |
|---|---|---|
| JP | 2-144676 | 6/1990 |
| JP | 6-68245 | 3/1994 |

(Continued)

OTHER PUBLICATIONS

L. G. Brown, "A Survey of Image Restoration Techniques," ACM Computing Surveys, vol. 24, pp. 325-376, Dec. 1992.*

(Continued)

*Primary Examiner* — Dave Czekaj
*Assistant Examiner* — Tyler W Sullivan
(74) *Attorney, Agent, or Firm* — Frommer Lawrence & Haug LLP; William S. Frommer; Paul A. Levy

(57) ABSTRACT

An image projecting device includes an image display unit that simultaneously displays left and right eye images in a line on a display panel and a projection optical system that projects the left and right eye images displayed on the display panel onto a screen in a superposed state. The display unit performs a transforming process for rotating the left eye image on a left eye image signal used to display the left eye image and for rotating the right eye image on a right eye image signal used to display the right eye image. The transformed left eye image signal and the transformed right eye image signal are synthesized to obtain an image signal for display use.

5 Claims, 20 Drawing Sheets

(56) References Cited

U.S. PATENT DOCUMENTS

| | | | |
|---|---|---|---|
| 2008/0151041 A1* | 6/2008 | Shafer et al. | 348/45 |
| 2008/0278689 A1* | 11/2008 | Read et al. | 353/7 |
| 2009/0102915 A1* | 4/2009 | Arsenich | 348/53 |
| 2009/0141043 A1* | 6/2009 | Guo et al. | 345/629 |
| 2009/0237490 A1* | 9/2009 | Nelson, Jr. | 348/43 |
| 2010/0128107 A1* | 5/2010 | Tomita | 348/43 |

FOREIGN PATENT DOCUMENTS

| | | |
|---|---|---|
| JP | 8-65714 | 3/1996 |
| JP | 8-79801 | 3/1996 |
| JP | 10-74077 | 3/1998 |
| JP | 11-27703 | 1/1999 |
| JP | 2001 285876 | 10/2001 |
| JP | 2002-125245 | 4/2002 |
| JP | 2002125245 A * | 4/2002 |
| JP | 2003 348597 | 12/2003 |
| JP | 2005-130312 | 5/2005 |
| JP | 2007 271828 | 10/2007 |

OTHER PUBLICATIONS

Office Action for corresponding Chinese Patent Application No. 200910221921.X, issued on Nov. 16, 2011.

* cited by examiner

FIG. 12

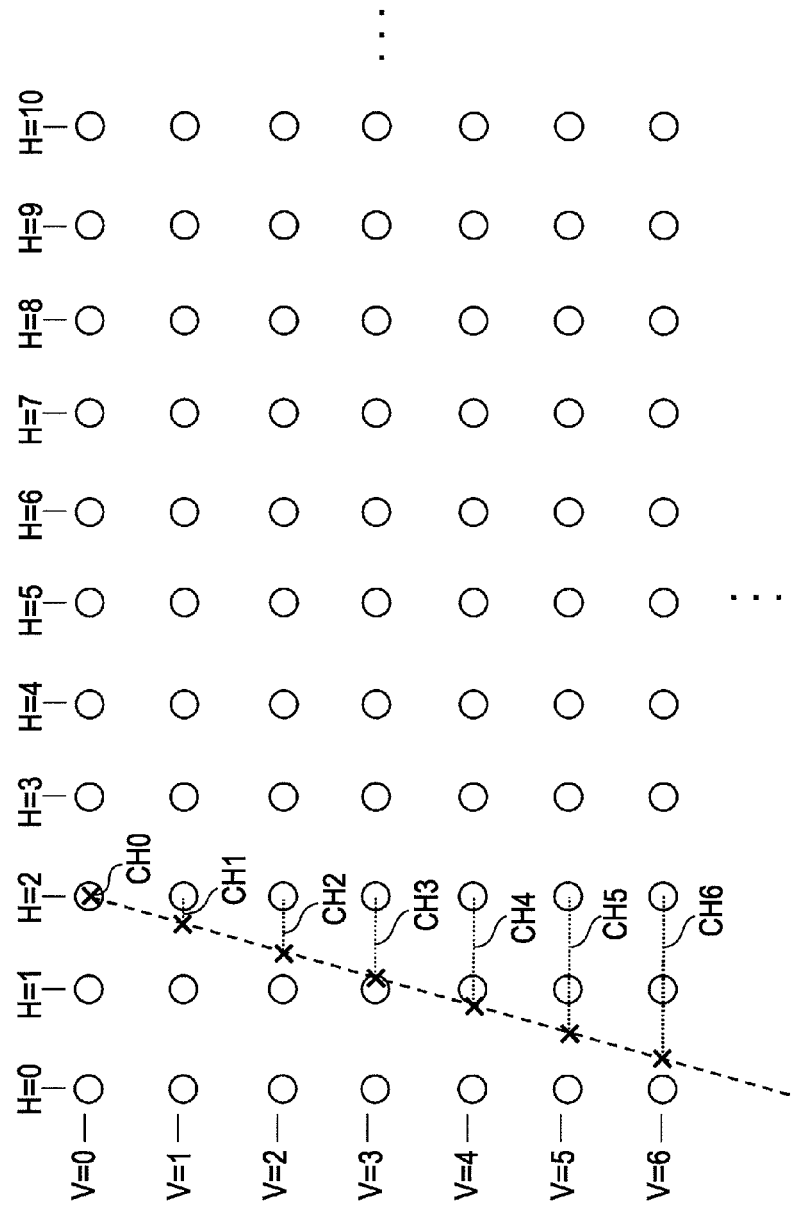

IMAGE SIGNAL PROCESSING DEVICE, METHOD AND PROJECTING DEVICE FOR STEREOSCOPIC IMAGES

The present application contains subject matter related to that disclosed in Japanese Priority Patent Application JP 2008-297712 filed in the Japan Patent Office on Nov. 21, 2008, the entire content of which is hereby incorporated by reference.

BACKGROUND OF THE INVENTION

1. Field of the Invention

The present invention relates to an image signal processing device, an image signal processing method and an image projecting device and more particularly relates to an image signal processing device, an image signal processing method and an image projecting device configured to obtain an image signal for use in stereoscopic image display in which a left eye image and a right eye image are simultaneously displayed in a line on a display panel.

2. Description of the Related Art

Recently, increasing resolution of a liquid crystal panel has been promoted and liquid crystal panels of the type suitable for an image signal (a 2K image signal) of a resolution of about 2048×1080 in the number of effective pixels are now being widely used (for example, see Japanese Laid-Open Patent Publication No. 2003-348597 and Japanese Laid-Open Patent Publication No. 2001-285876). In addition, a liquid crystal panel of the type suitable for an image signal (a 4K image signal) of a resolution of about 4096×2160 in the number of effective pixels is now being marketed. Further, a stereoscopic image projecting device configured to project a left eye image and a right eye image onto a screen in a superposed state to display a stereoscopic image using a single projector has been generally proposed (see, for example, Japanese Laid-Open Patent Publication No. 2007-271828).

SUMMARY OF THE INVENTION

In the device of the type configured to project the left eye image and the right eye image onto the screen in the superposed state to display the stereoscopic image as mentioned above, it sometimes occurs that positional displacement (hereinafter, referred to as displacement) induced by rotation is generated between the left eye image and the right eye image which are projected onto the screen depending on the accuracy of a projection optical system used.

It is desirable to correct displacement induced by rotation of images between a left eye image and a right eye image which would be generated in the case that the left eye image and the right eye image which have been displayed on a display panel are displayed on a screen in a superposed state using a projection optical system.

According to an embodiment of the present invention, there is provided an image projecting device including an image display unit configured to simultaneously display a left eye image and a right eye image in a line on a display panel and a projection optical system configured to project the left eye image and the right eye image which have been displayed on the display panel onto a screen in a superposed state, wherein the image display unit has a first transforming process unit configured to perform a transforming process for rotating a left eye image on a left eye image signal used to display the left eye image, a second transforming process unit configured to perform a transforming process for rotating a right eye image on a right eye image signal used to display the right eye image and a synthesizing unit configured to synthesize the left eye image signal obtained by being subjected to the transforming process using the first transforming process unit and the right eye image signal obtained by being subjected to the transforming process using the second converting process unit to obtain an output image signal for display use.

According to an embodiment of the present invention, a left eye image and a right eye image are simultaneously displayed in a line on a display panel of an image display unit. Then, the left eye image and the right eye image are projected onto a screen in a superposed state. For example, the left eye image is displayed with a first linearly polarized light obtained using a polarization control filter for a left eye image installed in the projection optical system and the right eye image is displayed with a second linearly polarized light obtained using a polarization control filter for a right eye image installed in the projection optical system. Therefore, a viewer may visually confirm a stereoscopic image by watching the left eye image and the right eye image which are being displayed on the screen in the superposed state through stereoscopic vision glasses.

The image display unit has the first transforming process unit, the second transforming process unit and the synthesizing unit. The first transforming process unit performs the transforming process for rotating the image on the left eye image signal. The second transforming process unit performs the transforming process for rotating the image on the right eye image signal. Then, the left eye image signal obtained by being subjected to the transforming process using the first transforming process unit is synthesized with the right eye image signal obtained by being subjected to the transforming process using the second transforming process unit using the synthesizing unit to obtain the image signal for display use (an output image signal).

As described above, owing to the provision of the first transforming process unit and the second transforming process unit on the image display unit, in the case that displacement is generated between the left eye image and the right eye image which are displayed on the screen in the superposed state due to rotation of images using the projection optical system, the displacement may be corrected by rotating one or both of the left eye image and the right eye image displayed on the liquid crystal panel.

According to an embodiment of the present invention, for example, each of the first and second transforming process units may have a first deforming process unit configured to perform a vertically tilted deforming process and a second deforming process unit configured to perform a horizontally tilted deforming process so as to perform a process for rotating the images by performing the vertically tilted deforming process and the horizontally tilted deforming process. In the above mentioned case, a vertical resolution transforming unit may be used as the first deforming process unit and a horizontal resolution transforming unit may be used as the second deforming process unit. As a result, the circuit configuration of the image display unit may be simplified.

According to an embodiment of the present invention, for example, the first transforming process unit may operate in cooperation with the second transforming process unit such that when the first transforming process unit performs the transforming process for rotating the left eye image in one direction, the second transforming process unit may perform the transforming process for rotating the right eye image in a direction opposite to one direction. In the above mentioned situation, in the case that displacement is generated between the left eye image and the right eye image which are being displayed in the superposed state on the screen due to the rotation of the images performed using the projection optical system, both the left eye image and the right eye image displayed on the liquid crystal panel may be mutually rotated in opposite directions to correct the displacement under the operation of a user. Therefore, the user does not have to rotate the left eye image and the right eye image displayed on the liquid display panel by separately determining directions in which the images are to be rotated and hence a correcting operation is simplified.

According to an embodiment of the present invention, for example, the projection optical system may include a relay lens upon which a light ray from the left eye image displayed on the display panel and a light ray from the right eye image displayed on the display panel are incident to form a real image of the left eye image and a real image of the right eye image which are separated from each other, a light guiding unit configured to separately guide the real images of the left and right eye images formed using the relay lens, a first projection lens configured to project the real image of the left eye image guided using the light guiding unit onto the screen and a second projection lens configured to project the real image of the right eye image guided using the light guiding unit onto the screen. In the above mentioned configuration, after the real image of the left eye image and the real image of the right eye image have been separated from each other using the relay lens, these real images are guided to the projection lenses via the light guiding unit, so that the brightness of the left eye image and the right eye image may be prevented from being reduced, which is advantageous to increase the image quality.

The device according to an embodiment of the present invention is of the type configured to synthesize the left eye image signal and the right eye image signal to obtain the image signals used to simultaneously display the left eye image and the right eye image in a line on the display panel and includes the first transforming process unit configured to perform the transforming process for rotating the image on the left eye image signal and the second transforming process unit configured to perform the transforming process for rotating the image on the right eye image signal. Therefore, the displacement between the both images generated due to the rotation of the images when the left eye image and the right eye image which have been displayed on the display panel are to be displayed in the superposed state on the screen using the projection optical system may be favorably corrected.

BRIEF DESCRIPTION OF THE DRAWINGS

As shown throughout the drawings, like reference characters designate like or corresponding parts.

FIG. 12 is a diagram illustrating operations of a vertical resolution transforming process (the number of pixels is increased and the size of an image is increased) performed using a vertical transforming unit of a resolution transforming unit according to an embodiment of the present invention;

FIG. 20 is a diagram illustrating operations of a horizontally titled deforming process (in the case that the position of the upper end is displaced leftward and the position of the lower end is displaced rightward) performed using a horizontal transforming unit of a resolution transforming unit according to an embodiment of the present invention;

DESCRIPTION OF THE PREFERRED EMBODIMENTS

Next, preferred embodiments of the present invention will be described with reference to the accompanying drawings in the following order.
1. Preferred embodiments of the invention
2. Modified examples

Preferred Embodiments

Structural Example of a Stereoscopic Image Projecting Device

Figure 1:
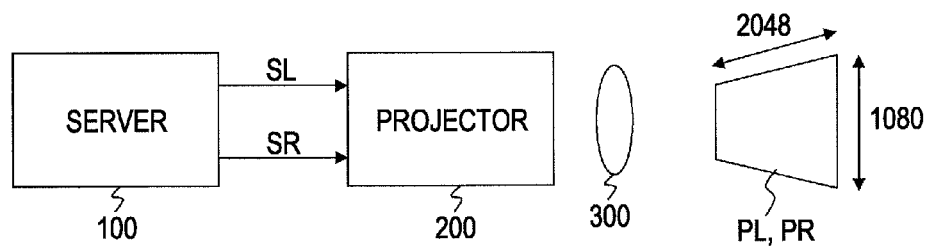
FIG. 1 is a block diagram showing a structural example of a stereoscopic image projecting device according to an embodiment of the present invention.

FIG. 1 shows a structural example of a stereoscopic image projecting device 10 according to an embodiment of the present invention. The stereoscopic image projecting device 10 includes a server 100, a projector 200 and a three-dimensional projection optical system 300. The server 100 is configured to supply image signals to the projector 200. The projector 200 is configured to project images formed on the basis of the image signals supplied from the server 100 onto a screen through the projection optical system 300. A liquid crystal panel (a 4K liquid crystal panel) having about 4096× 2160 effective pixels is installed in the projector 200, although not shown in FIG. 1.

The server 100 outputs a left eye image signal SL and a right eye image signal SR. The image signals SL and SR are image signals used to respectively display 2K images (the images each having 2048×1080 pixels). The image signals SL and SR output from the server 100 are supplied to the projector 200.

Figure 2:
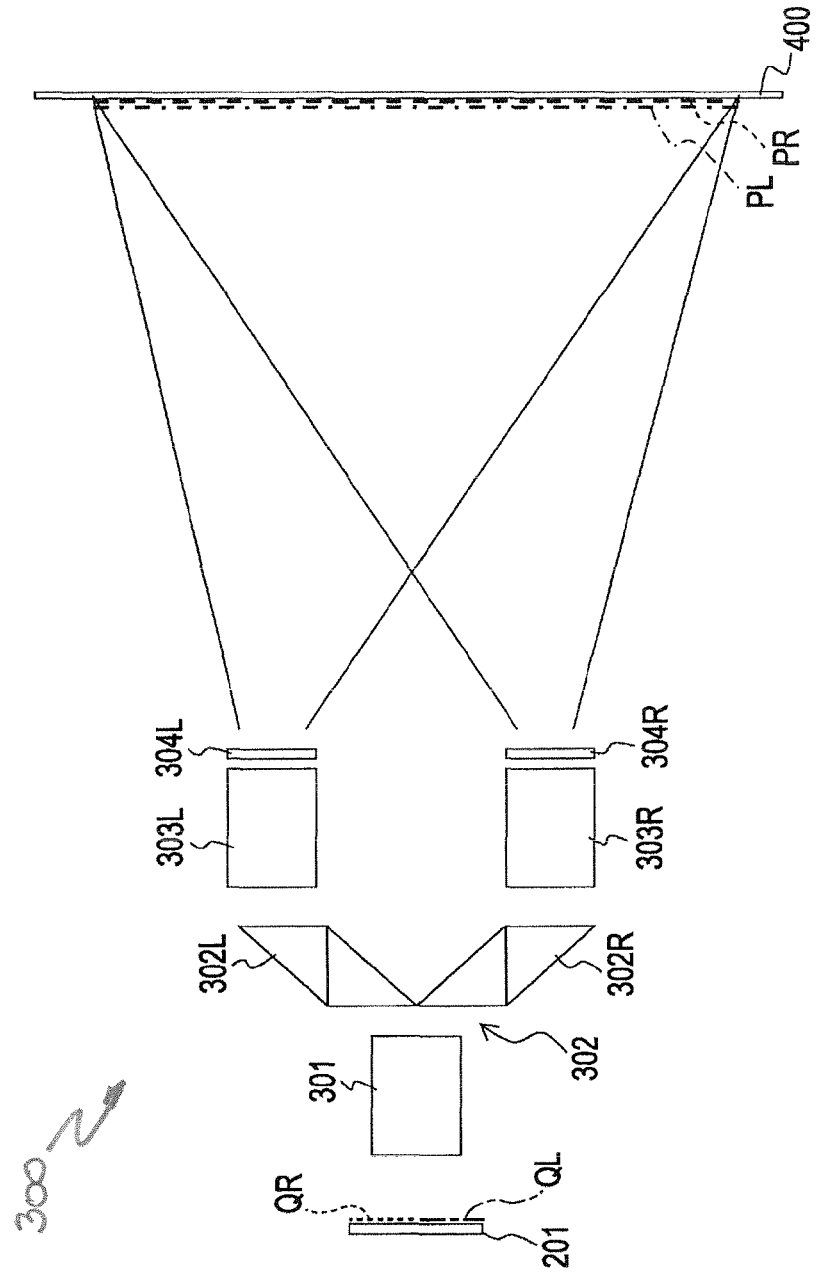
FIG. 2 is a diagram illustrating a state in which a left eye image and a right eye image are being projected onto a screen upon stereoscopic image display.
Figure 3:
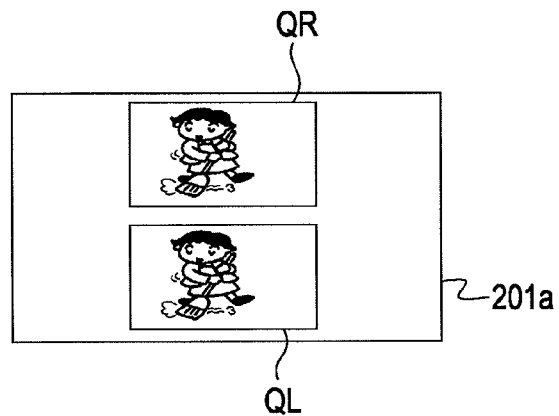
FIG. 3 is a diagram showing an example in which a left eye image and a right eye image are displayed on a display screen of a liquid crystal panel of a projector.

FIG. 2 is a diagram illustrating a state in which a left eye image and a right eye image are being projected onto a screen 400. FIG. 3 is a diagram showing an example in which a left eye image and a right eye image are displayed on a display screen 201a of a liquid crystal panel 201 of the projector 200. As shown in FIG. 3, a 2K left eye image QL and a 2K right eye image QR are simultaneously displayed on parts of the display screen 201a of the liquid crystal panel (a 4K liquid crystal panel) 201. In the example shown in FIG. 3, the 2K right eye image QR formed on the basis of the right eye image signal SR is displayed in an upper central area on the display screen 201a and the 2K left eye image QL formed on the basis of the left eye image signal SL is displayed in a lower central area on the display screen 201a.

The 2K left eye image QL and the 2K right eye image QR which have been displayed on the liquid crystal panel (the 4K liquid crystal panel) 201 are projected onto the screen 400 through the three-dimensional projection optical system 300 as shown in FIG. 2. A 2K left eye image PL and a 2K right eye image PR are displayed on the screen 400 in a superposed state.

Next, the three-dimensional projection optical system 300 will be described. The projection optical system 300 has a relay lens 301, a prism block 302, a projection lens 303L for a left eye image (hereinafter, referred to as a left eye image projection lens), a projection lens 303R for a right eye image (hereinafter, referred to as a right eye image projection lens), a polarization control filter 304L for a left eye image (hereinafter, referred to as a left eye image polarization control filter) and a polarization control filter 304R for a right eye image (hereinafter, referred to as a right eye image polarization control filter).

Light rays from the left eye image QL and the right eye image QR which have been displayed on the liquid crystal panel 201 are incident on the relay lens 301 to form a real image of the left eye image and a real image of the right eye image which are separated from each other. The prism block 302 guides the real image of the left eye image and the real image of the right eye image which have been formed through the relay lens 301 in different directions. The prism block 302 constitutes a light guiding unit and includes a prism block 302L for a left eye image (hereinafter, referred to as a left eye image prism block) and a prism block 302R for a right eye image (hereinafter, referred to as a right eye image prism block). In the above mentioned case, the prism blocks 302L and 302R separately guide the real image of the left eye image and the real image of the right eye image from a light outgoing plane of the relay lens 301 in directions in which the real images are guided apart from each other.

The left eye image projection lens 303L projects the real image of the left eye image guided from the prism block 302L onto the screen 400 to display the 2K left eye image PL on the screen 400. The projection lens 303L constitutes a first projection lens. The right eye image projection lens 303R projects the real image of the right eye image guided from the prism block 302R onto the screen 400 to display the 2K right eye image PR on the screen 400. The projection lens 303R constitutes a second projection lens.

The polarization control filter 304L is disposed on the light outgoing side of the left eye image projection lens 303L and transforms a circularly polarized light to a first linearly polarized light (one of a vertically polarized light and a horizontally polarized light). The polarization control filter 304R is disposed on the light outgoing side of the right eye image projection lens 303R and transforms a circularly polarized light to a second linearly polarized light (the other of the vertically polarized light and the horizontally polarized light).

A light ray from the 2K left eye image QL displayed on the liquid crystal panel 201 passes through the relay lens 301, the prism block 302L, the projection lens 303L and the polarization control filter 304L and is projected onto the screen 400. As a result, the left eye image PL formed on the basis of the first linearly polarized light is displayed on the screen 400. Likewise, a light ray from the 2K right eye image QR displayed on the liquid crystal panel 201 passes through the relay lens 301, the prism block 302R, the projection lens 303R and the polarization control filter 304R and is projected onto the screen 400. As a result, the right eye image PR formed on the basis of the second linearly polarized light is displayed on the screen 400 superposing on the 2K left eye image PL.

As described above, the projection optical system 300 is configured such that the real images of the left eye and right eye images which have been displayed on the liquid crystal panel 201 are separated from each other using the relay lens 301 and then the real images so separated are guided using the prism blocks 302L and 302R to the projection lenses 303L and 303R. Therefore, the brightness of the left eye image PL and the right eye image PR displayed on the screen 400 may be prevented from being reduced and the image quality may be increased accordingly.

For example, there has been so far conceived of such a configuration that light rays radiated from a projection lens are separated into light rays for a left eye image and a right eye image using separating means. In the above mentioned configuration, some of light rays radiated from the projection lens may not be accurately separated into the light rays for the left and right eye images. Thus, some of the light rays for the left and right eye images may not be projected onto correct positions on the screen and hence the brightness of the left and right eye images may be reduced and hence the image quality may be reduced.

On the other hand, according to an embodiment of the present invention, the viewer may visually confirm a stereoscopic image by watching the left eye image PL and the right eye image PR which are being displayed in a superposed state on the screen 400 through stereoscopic view glasses not shown. The stereoscopic view glasses have a left eye filter and a right eye filter. The left eye filter is a polarization filter configured to transmit the first linearly polarized light forming the left eye image PL displayed on the screen 400. The right eye filter is a polarization filter configured to transmit the second linearly polarized light forming the right eye image PR displayed on the screen 400.

Figure 4:
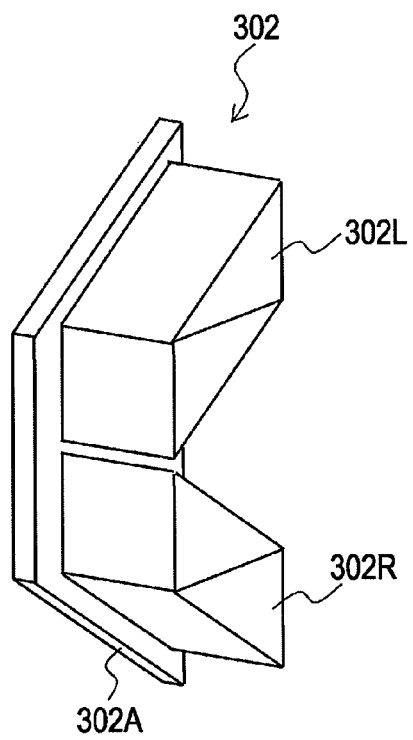
FIG. 4 is a diagram showing a state in which a prism block constituting a three-dimensional projection optical system is fixed onto a prism fixing pedestal.

FIG. 4 shows a state in which the prism blocks 302 (302L and 302R) have been fixed onto a prism fixing pedestal 302A. FIG. 4 shows a diagram of the prism blocks 302 (302L and 302R) obliquely viewed from the side of a plane of incidence. In the example shown in FIG. 4, the left eye image prism block 302L and the right eye image prism block 302R are fixed onto the prism fixing pedestal 302A with an adhesive.

Figure 5A:
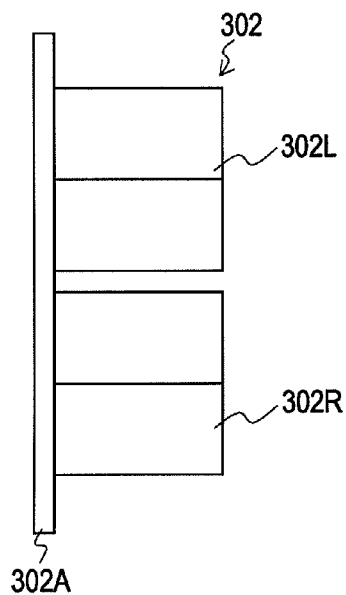
FIG. 5A is a diagram showing a state in which an error in the rotating direction is not generated between a prism block for a left eye image and a prism block for a right eye image.

In a configuration of the type that the prism blocks 302 (302L and 302R) are fixed onto the prism fixing pedestal 302 as described above, an error in rotating direction may be sometimes generated between the prism blocks 302L and 302R. The error is generated depending on the plane accuracy or the adhering accuracy of the prism fixing pedestal 302A. FIG. 5A shows a state in which an error in rotating direction is not generated between the prism blocks 302L and 302R.

Figure 5B:
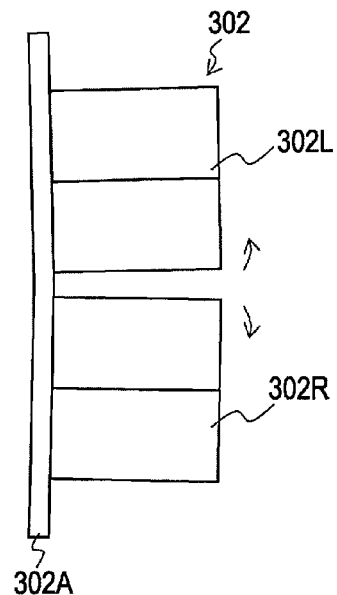
FIG. 5B is a diagram showing a state in which the error is generated.

FIG. 5B shows a state in which the error in rotating direction is generated between the prism blocks 302L and 302R. In the state shown in FIG. 5B, the prism block 302L is rotated counterclockwise and the prism block 302R is rotated clockwise unlike the state shown in FIG. 5A.

Figure 6A:
FIG. 6A is a diagram illustrating one example of displacement in rotating direction between a left eye image PL and a right eye image PR which are displayed on a screen.
Figure 6B:
FIG. 6B is a diagram illustrating another example of displacement.
Figure 6C:
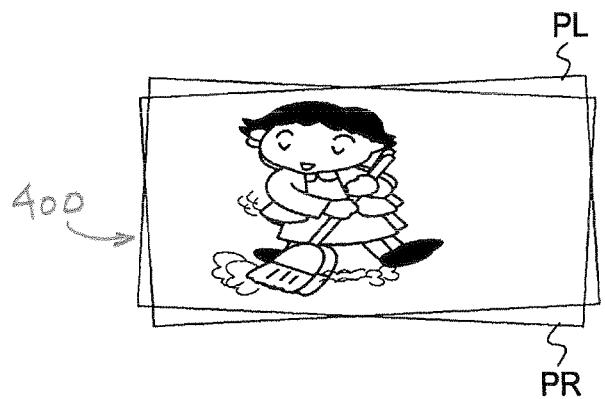
FIG. 6C is a diagram illustrating a further example of displacement.

In the case that the prism blocks are in the state shown in FIG. 5B, the left eye image PL is displayed on the screen 400 as shown in FIG. 6A, that is, displayed in a state in which it is rotated counterclockwise from its normal position shown by broken lines. Likewise, in the state shown in FIG. 5B, the right eye image PR is displayed on the screen 400 as shown in FIG. 6B, that is, displayed in a state in which it is rotated clockwise from its normal position shown by broken lines. Thus, the left eye image PL and the right eye image PR are displayed on the screen 400 in a state that display positions thereof are displaced from their correct positions as shown in FIG. 6C.

According to an embodiment of the present invention, the displacement between the left eye image PL and the right eye image PR displayed on the screen 400 may be corrected by rotating the left eye image QL and the right eye image QR displayed on the liquid crystal panel 201 of the projector 200. The configuration for rotating the left eye image QL and the right eye image QR will be described later.

Structural Example of a Projector

Figure 7:
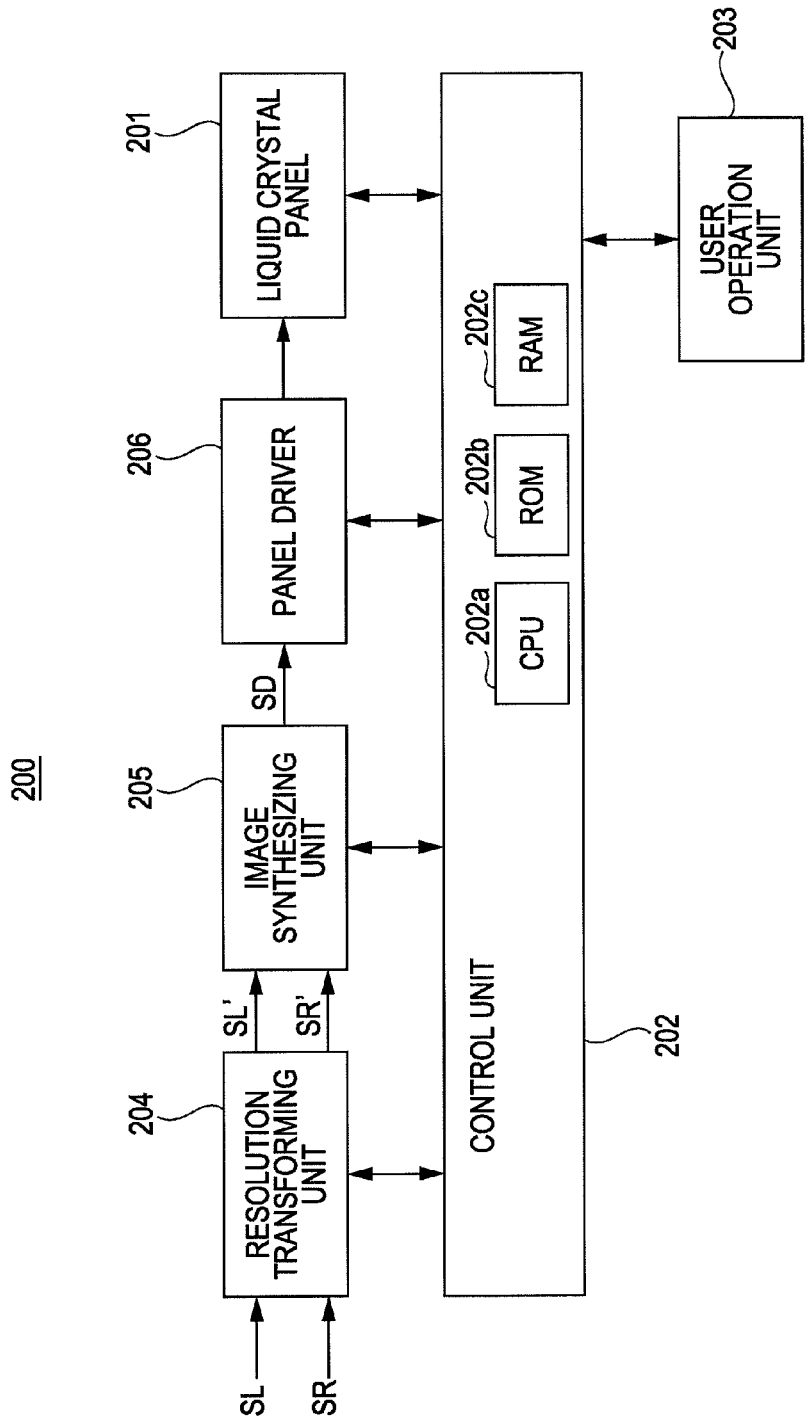
FIG. 7 is a block diagram showing a structural example of a projector according to an embodiment of the present invention.

Next, a structural example of the projector 200 will be described. FIG. 7 shows the structural example of the projector 200. The projector 200 includes a control unit 202, a user operation unit 203, a resolution transforming unit 204, an image synthesizing unit 205, a panel driver 206 and the liquid crystal panel 201.

The control unit 202 is configured to control the operations of respective parts of the projector 200 and has a CPU 202a, a ROM 202b and a RAM 202c. The ROM 202b stores therein control programs of the CPU 202a. The RAM 202c is used to temporarily store data necessary for execution of control processes using the CPU 202a. The CPU 202a expands a program and data read out from the ROM 202b on the RAM 202c to start up the program to control the operations of respective parts of the projector 200.

The user operation unit 203 constitutes a user interface and is connected to the control unit 202. The user operation unit 203 is constituted by keys, buttons or a remote controller disposed in a housing not shown of the projector 200. The user may perform various operations such as an operation of correcting the displacement (see FIG. 6C) between the left eye image PL and the right eye image PR displayed on the screen using the user operation unit 203.

The resolution transforming unit 204 is configured to perform a resolution transforming process on the left eye image signal SL and the right eye image signal SR as necessary. The number of pixels in a vertical direction and in a horizontal direction may be adjusted by performing the resolution transforming process. That is, the size of an image may be increased by increasing the number of pixels or the size of the image may be decreased by decreasing the number of pixels.

The resolution transforming unit 204 performs a transforming process for rotating the left eye image QL displayed on the liquid crystal panel 201 on the left eye image signal SL and performs a transforming process for rotating the right eye image QR displayed on the liquid crystal panel 201 on the right eye image signal SR as necessary. The transforming processes are performed on the image signals SL and SR under the operation of the user in the case that displacement induced by image rotation is generated between the left eye image PL and the right eye image PR displayed on the screen 400 as mentioned above. The details of the resolution transforming unit 204 will be described later.

The image synthesizing unit 205 is configured to synthesize a left eye image signal SL' and a right eye image signal SR' which have been processed using the resolution transforming unit 204 to generate an image signal SD for display use (hereinafter, referred to as a display-use image signal SD). The display-use image signal SD is an image signal used to simultaneously display the left eye image QL and the right eye image QR in a line on the display screen 201a of the liquid crystal panel 201.

The panel driver 206 is configured to drive the liquid crystal panel 201 on the basis of the display-use image signal SD output from the image synthesizing unit 205 to simultaneously display the left eye image QL and the right eye image QR in a line on the liquid crystal panel 201.

Next, the operations of the projector 200 shown in FIG. 7 will be described. The left eye image signal SL and the right eye image signal SR are supplied to the resolution transforming unit 204. In the resolution transforming unit 204, vertical and horizontal resolution transforming processes and transforming processes for rotating images are performed on the image signals SL and SR as necessary. The left eye image signal SL' and the right eye image signal SR' which have been processed using the resolution transforming unit 204 are supplied to the image synthesizing unit 205.

In the image synthesizing unit 205, the image signals SL' and SR' are synthesized to generate the display-use image signal SD. The display-use image signal SD is supplied to the panel driver 206. Thus, the left eye image QL and the right eye image QR are simultaneously displayed in a line on the display screen 201a of the liquid crystal panel 201 on the basis of the display-use image signal SD (see FIG. 3).

When enlargement of images has been instructed under the operation of the user, the resolution transforming unit 204 performs the vertical and horizontal resolution transforming processes for increasing the number of pixels on the image signals SL and SR. As a result, the images QL and QR to be displayed on the liquid crystal panel 201 will be enlarged and hence the images PL and PR to be displayed on the screen 400 will be enlarged accordingly.

When size reduction of images has been instructed under the operation of the user, the resolution transforming unit 204 performs the vertical and horizontal resolution transforming processes for decreasing the number of pixels on the image signals SL and SR. Thus, the images QL and QR to be displayed on the liquid crystal panel 201 will be reduced and hence the images PL and PR to be displayed on the screen 400 will be reduced accordingly.

When rotation of images has been instructed under the operation of the user, the resolution transforming unit 204 performs the transforming processes for rotating the images QL and QR to be displayed on the liquid crystal panel 201 on the image signals SL and SR. Thus, the images QL and QR to be displayed on the liquid crystal panel 201 will be rotated in specified directions.

According to an embodiment of the present invention, the user may selectively perform an operation in an independent mode in which the left eye image QL and the right eye image QR are rotated independently of each other or in a cooperation mode in which the left eye image QL and the right eye image QR are rotated in cooperation with each other. Under the operation of the user in the independent mode, in the resolution transforming unit 204, a transforming process for rotating an image concerned is performed on an image signal corresponding to the image concerned so as to rotate only the image concerned, that is, the left eye image QL or the right eye image QR, whose rotation has been instructed from the user.

Under the operation of the user in the cooperation mode, in the resolution transforming unit 204, a transforming process for rotating both the images is performed on both the image signals SL and SR so as to rotate not one image, that is, the left eye image QL or the right eye image QR, whose rotation has been instructed from the user, but both the images. In this case, the other image is rotated in a direction opposite to that of the image whose rotation has been instructed from the user.

Figure 8A:
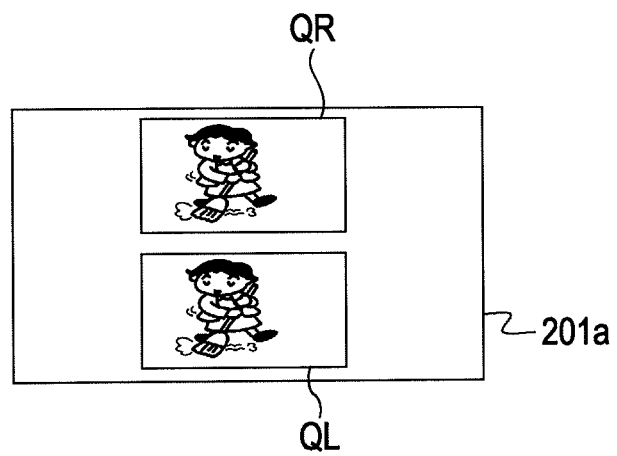
FIG. 8A is a diagram illustrating a manner of adjusting rotation of a left eye image and a right eye image displayed on a liquid crystal panel under the operation of a user.

Under the operation of the user to rotate the left eye image QL and the right eye image QR displayed on the liquid crystal panel 201 as mentioned above, the left eye image QL and the right eye image QR displayed on the display screen 201a of the liquid crystal panel 201 may be adjusted from the state shown in FIG. 8A to the state shown in 8B. That is, in the state shown in FIG. 8B, the left eye image QL is rotated clockwise from the state in FIG. 8A and the right eye image QR is rotated counterclockwise from the state in FIG. 8A. Display positions of the left eye image QL and the right eye image QR in FIG. 8A are shown by broken lines in FIG. 8B.

Figure 8B:
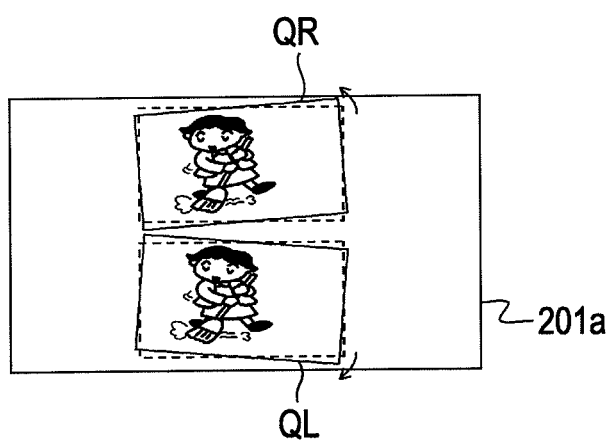
FIG. 8B is a diagram illustrating the manner of adjusting the rotation.

The left eye image PL and the right eye image PR displayed on the screen 400 in a state that their display positions are displaced from each other as shown in FIG. 6A may be rotated by adjusting their display positions from the state shown in FIG. 8A to the state shown in FIG. 8B, thereby aligning their display positions with each other.

As described above, under the operation of the user in the cooperation mode, the displacement in the display position between the left eye image PL and the right eye image PR to be displayed on the screen 400 may be corrected by rotating the left eye image QL and the right eye image QR displayed on the liquid crystal panel 201 in opposite directions under the operation of the user. Therefore, it may become unnecessary for the user to separately determine directions in which the left eye image QL and the right eye image QR displayed on the liquid crystal panel 201 are rotated and to rotate the images in the determined directions and hence the correcting operation may be facilitated.

Structural Example of the Resolution Transforming Unit

Next, a structural example of the resolution transforming unit 204 will be described. The resolution transforming unit 204 has a resolution transforming unit for the left eye image signal SL and a resolution transforming unit for the right image signal SR. These resolution transforming units are configured in the same manner. Thus, here, only the resolution transforming unit for the left eye image signal SL will be described and description of the resolution transforming unit for the right eye image signal SR will be omitted.

Figure 9:
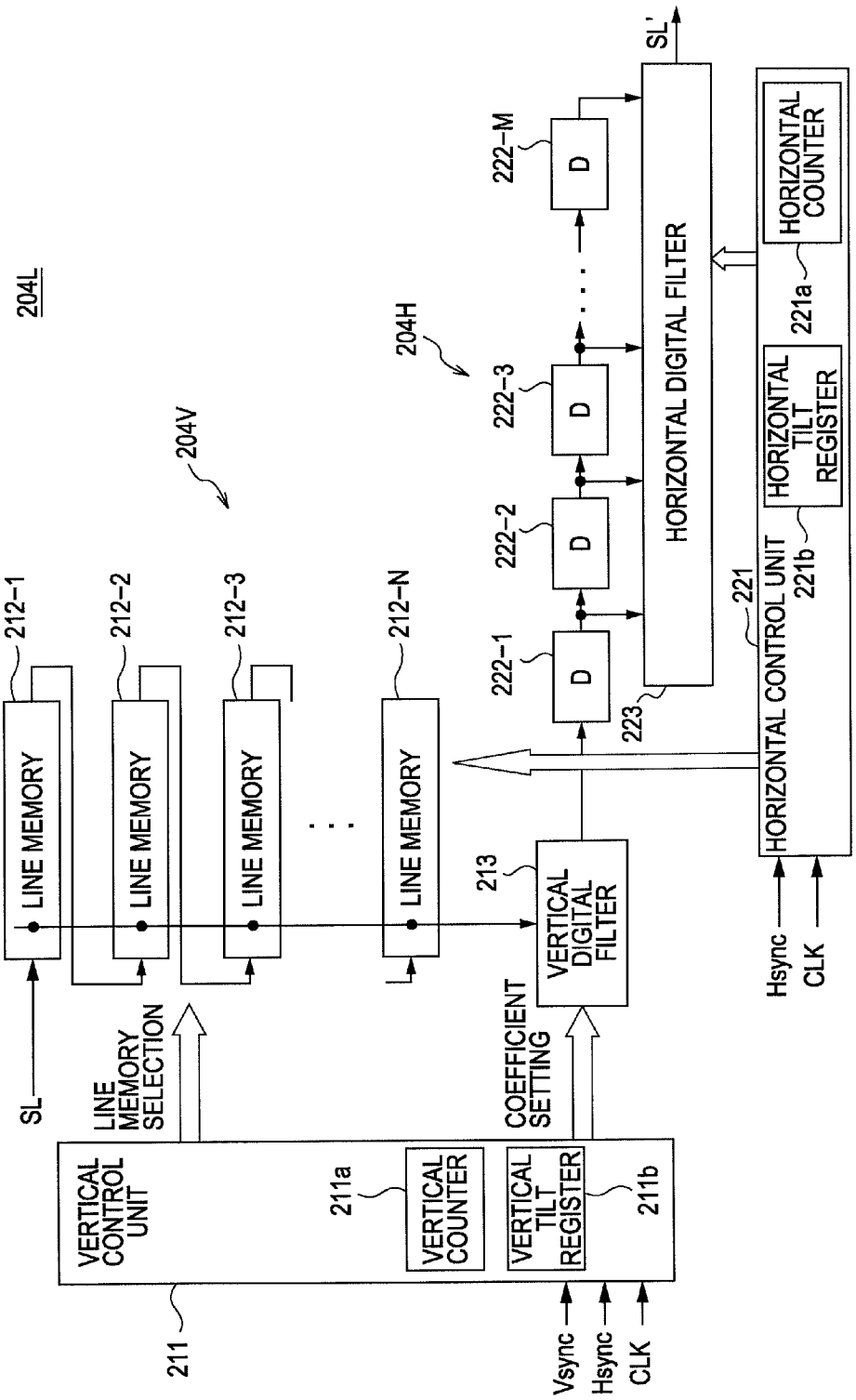
FIG. 9 is a block diagram illustrating a structural example of a resolution transforming unit for a left eye image signal according to an embodiment of the present invention.

FIG. 9 shows a structural example of a resolution transforming unit 204L for the left eye image signal SL. The resolution transforming unit 204L has a vertical transforming unit 204V and a horizontal transforming unit 204H. As for resolution transformation, the vertical transforming unit 204V performs a vertical resolution transforming process for adjusting the number of pixels in a vertical direction and the horizontal transforming unit 204H performs a horizontal resolution transforming process for adjusting the number of pixels in a horizontal direction.

As for rotation of images, the vertical transforming unit 204V performs a vertically tilted deforming process and the horizontal transforming unit 204H performs a horizontally tilted deforming process. Here, the vertically tilted deforming process is a process of deforming a rectangular image such that the positions of left and right ends thereof are displaced from their current positions in a vertical direction and the horizontally tilted deforming process is a process of deforming the rectangular image such that the positions of upper and lower ends thereof are displaced from their current positions in a horizontal direction.

The left eye image QL displayed on the liquid crystal panel 201 may be rotated by performing the vertically tilted deforming process and the horizontally tilted deforming process on the left eye image signal SL in the above mentioned manner. In this respect, the vertical transforming unit 204V and the horizontal transforming unit 204H constitute a transforming process unit configured to perform a transforming process for rotating an image concerned on the left eye image signal SL.

Figure 10A:
FIG. 10A is a diagram illustrating a manner of rotating counterclockwise a left eye image on a liquid crystal panel by performing a vertically tilted deforming process and a horizontally tilted deforming process on a left eye image signal.
Figure 10C:
FIG. 10C is a diagram illustrating the manner of rotating counterclockwise the left eye image.
Figure 10B:
FIG. 10B is a diagram illustrating the manner of rotating counterclockwise the left eye image.
Figure 10D:
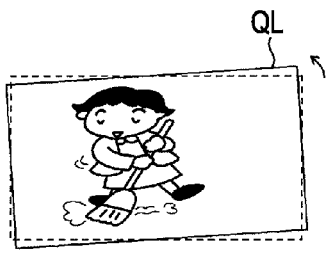
FIG. 10D is a diagram illustrating the manner of rotating counterclockwise the left eye image.

In the above mentioned case, the following deforming process is performed in order to rotate the left eye image QL counterclockwise. That is, in the vertically tilted deforming process, deformation in which the position of the left end is displaced downward and the position of the right end is displaced upward as shown in FIG. 10B is performed on the rectangular left eye image QL shown in FIG. 10A. While, in the horizontally tilted deforming process, deformation in which the position of the upper end is displaced leftward and the position of the lower end is displaced rightward as shown in FIG. 10C is performed on the rectangular left eye image QL shown in FIG. 10A. As a result, the rectangular left eye image QL shown in FIG. 10A enters a state in which it is rotated counterclockwise as shown in FIG. 10D. Incidentally, the configuration or the display positions of the left eye image QL in FIG. 10A are shown by broken lines in FIGS. 10B to 10D.

Figure 11A:
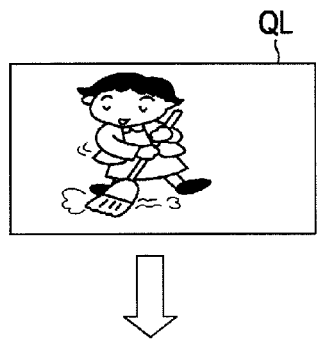
FIG. 11A is a diagram illustrating a manner of rotating clockwise a left eye image on a liquid crystal panel by performing a vertically tilted deforming process and a horizontally tilted deforming process on a left eye image signal.
Figure 11C:
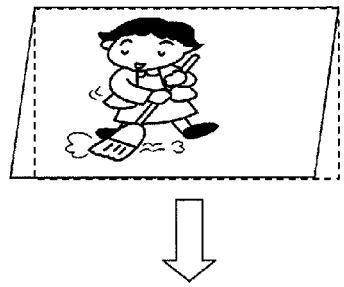
FIG. 11C is a diagram illustrating the manner of rotating clockwise the left eye image.
Figure 11B:
FIG. 11B is a diagram illustrating the manner of rotating clockwise the left eye image.
Figure 11D:
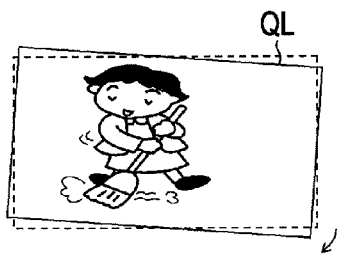
FIG. 11D is a diagram illustrating the manner of rotating clockwise the left eye image.

In the above mentioned case, the following deforming process is performed in order to rotate the left eye image SL clockwise. That is, in the vertically tilted deforming process, deformation in which the position of the left end is displaced upward and the position of the right end is displaced downward as shown in FIG. 11B is performed on the rectangular left eye image QL shown in FIG. 11A. While, in the horizontally tilted deforming process, deformation in which the position of the upper end is displaced rightward and the position of the lower end is displaced leftward as shown in FIG. 11C is performed on the rectangular left eye image QL shown in FIG. 11A. As a result, the rectangular left eye image QL shown in FIG. 11A enters a state in which it is rotated clockwise as shown in FIG. 11D. Incidentally, the configuration or the display positions of the left eye image QL in FIG. 11A are shown by broken lines in FIGS. 11B to 11D.

That the images are rotated by performing the vertically tilted deforming process and the horizontally tilted deforming process on the images as mentioned above will be described in accordance with the following numerical formulae.

In the numerical formulae, it is supposed that the coordinates of each pixel in an image which is not yet subjected to transformation are (x,y) and the coordinates of each pixel in the image which has been subjected to transformation are (X, Y). Coordinate transformation to be performed when an image is rotated by $\theta$ is expressed by a numerical formula (1)

[Numerical Formula 1]

$$\begin{pmatrix} X \\ Y \end{pmatrix} = \begin{pmatrix} \cos\theta & -\sin\theta \\ \sin\theta & \cos\theta \end{pmatrix} \begin{pmatrix} x \\ y \end{pmatrix} \qquad (1)$$

In an embodiment of the present invention, the angle $\theta$ is as very small as about $\theta = \arctan(4 \text{ dots}/1000 \text{ dots}) = 0.23°$. In this case, a transformation matrix in the formula (1) is expressed by a numerical formula (2).

[Numerical Formula 2]

$$\begin{pmatrix} \cos\theta & -\sin\theta \\ \sin\theta & \cos\theta \end{pmatrix} = \begin{pmatrix} \cos 0.23° & -\sin 0.23° \\ \sin 0.23° & \cos 0.23° \end{pmatrix} = \begin{pmatrix} 0.9999 & -0.004 \\ 0.004 & 0.9999 \end{pmatrix} \qquad (2)$$

Coordinate transformation when an image is deformed in a vertically tilted direction is expressed by a numerical formula (3).

[Numerical Formula 3]

$$\begin{pmatrix} X \\ Y \end{pmatrix} = \begin{pmatrix} 1 & 0 \\ -a & 1 \end{pmatrix} \begin{pmatrix} x \\ y \end{pmatrix} \qquad (3)$$

In an embodiment of the present invention, "a" is as very small as about "a"=4 dots/1000 dots=0.004. In this case, a transformation matrix in the numerical formula (3) is expressed by a numerical formula (4).

[Numerical Formula 4]

$$\begin{pmatrix} 1 & 0 \\ -a & 1 \end{pmatrix} = \begin{pmatrix} 1 & 0 \\ -0.004 & 1 \end{pmatrix} \qquad (4)$$

Coordinate transformation when an image is deformed in a horizontally tilted direction is expressed by a numerical formula (5).

[Numerical Formula 5]

$$\begin{pmatrix} X \\ Y \end{pmatrix} = \begin{pmatrix} 1 & a \\ 0 & 1 \end{pmatrix} \begin{pmatrix} x \\ y \end{pmatrix} \qquad (5)$$

In an embodiment of the present invention, "a" is as very small as about "a"=4 dots/1000 dots=0.004. In this case, a transformation matrix in the numerical formula (5) is expressed by a numerical formula (6).

[Numerical Formula 6]

$$\begin{pmatrix} 1 & a \\ 0 & 1 \end{pmatrix} = \begin{pmatrix} 1 & 0.004 \\ 0 & 1 \end{pmatrix} \qquad (6)$$

Coordinate transformation when both the vertically tilted deformation and the horizontally tilted deformation are performed is expressed by a numerical formula (7) from the formulae (3) and (5).

[Numerical Formula 7]

$$\begin{pmatrix} X \\ Y \end{pmatrix} = \begin{pmatrix} 1 & 0 \\ -a & 1 \end{pmatrix} \begin{pmatrix} 1 & a \\ 0 & 1 \end{pmatrix} \begin{pmatrix} x \\ y \end{pmatrix} \qquad (7)$$

In an embodiment of the present invention, "a" is as very small as about "a"=4 dots/1000 dots=0.004. In this case, a transformation matrix in the numerical formula (7) is expressed by a numerical formula (8).

[Numerical Formula 8]

$$\begin{pmatrix} 1 & 0 \\ -a & 1 \end{pmatrix}\begin{pmatrix} 1 & a \\ 0 & 1 \end{pmatrix} = \begin{pmatrix} 1 & 0 \\ -0.004 & 1 \end{pmatrix}\begin{pmatrix} 1 & 0.004 \\ 0 & 1 \end{pmatrix} = \begin{pmatrix} 1 & 0.004 \\ -0.004 & 0.99998 \end{pmatrix} \quad (8)$$

For small angle assumptions, the component configuration of the transformation matrix expressed by the numerical formula (8) approximates that of the transformation matrix in the rotation coordinate transformation expressed by the numerical formula (2). This fact indicates that the images may be rotated by performing the vertically tilted deforming process and the horizontally tilted deforming process thereon.

Description will be made returning to the example shown in FIG. 9. As shown in FIG. 9, the vertical transforming unit 204V has a vertical control unit 211, a plurality of line memories 212-1 to 212-N and a vertical digital filter 213. The plurality of line memories 212-1 to 212-N are series-connected with one another. Pixel signals on each line of the left eye image signal SL which has been input into the line memory 212-1 sequentially move to subsequent line memories as the process proceeds.

The vertical control unit 211 has a vertical counter 211a and a vertical tilt register 211b. The vertical counter 211a is reset with a vertical synchronous signal Vsync and is incremented with a horizontal synchronous signal Hsync. A correction value which is to be added to a value counted using the vertical counter 211a (hereinafter, referred to as a counted value of the vertical counter 211a) every time a pixel clock signal CLK is received in the case that the vertically tilted transforming process is to be performed is held in the vertical tilt register 211b.

The vertical control unit 211 selects a plurality of line memories from which pixels signals are to be read out from the line memories 212-1 to 212-N on the basis of the counted value of the vertical counter 211a. In addition, the vertical control unit 211 sets a coefficient (a weighted coefficient) to be multiplied to each of the pixel signals which have been read out from the plurality of line memories so selected in the vertical digital filter 213.

The vertical digital filter 213 multiplies each of the pixel signals read out from the plurality of line memories so selected and the set coefficient and then adds them together to output a pixel signal which has been so processed. Incidentally, setting of an address for reading out the pixel signals from the plurality of line memories so selected is performed using the horizontal transforming unit 204H as will be described later.

The horizontal transforming unit 204H has a horizontal control unit 221, a plurality of pixel delay circuits 222-1 to 222-M and a horizontal digital filter 223. The plurality of pixel delay circuits 222-1 to 222-M are series-connected with one another and the respective pixel signals which have been input into the pixel delay circuit 222-1 from the vertical digital filter 213 sequentially move to the subsequent pixel delay circuits as the process proceeds.

The horizontal control unit 221 has a horizontal counter 221a and a horizontal tilt register 221b. The horizontal counter 221a is reset with the horizontal synchronous signal Hsync and is incremented with the pixel clock signal CLK. A correction value which is to be added to a value counted using the horizontal counter 221a (hereinafter, a counted value of the horizontal counter 221a) every time the horizontal synchronous signal Hsync is received in the case that the horizontally tilted deforming process is to be performed is held in the horizontal tilt register 221b.

The horizontal control unit 221 sets the address for reading out the pixel signals from the plurality of line memories which have been selected using the vertical control unit 211 in the vertical transforming unit 204V as described above on the basis of the counted value of the horizontal counter 221a. In addition, the horizontal control unit 221 sets a coefficient (a weighted coefficient) to be multiplied to each of the respective pixel signals output from the pixel delay circuits 222-1 to 222-M in the horizontal digital filter 223.

The horizontal digital filter 223 multiplies each of the pixel signals output from the pixel delay circuits 222-1 to 222-M and the set coefficient and then adds them together to output a pixel signal which has been so processed. The signal output from the horizontal digital filter 223 will serve as the left eye image signal SL' which has been so processed.

Next, the operations performed using the resolution transforming unit 204L shown in FIG. 9 will be described. First, the operations of the vertical resolution transforming process performed using the vertical transforming unit 204V will be described with reference to FIGS. 12 and 13.

In the resolution transforming unit 204L, pixel signals on a vertical line corresponding to the counted value concerned of the vertical counter 221a are generated for each line duration by performing the vertical resolution transforming process. The vertical counter 211a is incremented every time the horizontal synchronous signal Hsync is received as mentioned above. Thus, in the case that the incremented value is "1", the number of pixels in the vertical direction is the same as that obtained for the input left eye image signal SL and hence the image is neither enlarged nor reduced in the vertical direction.

Figure 12:
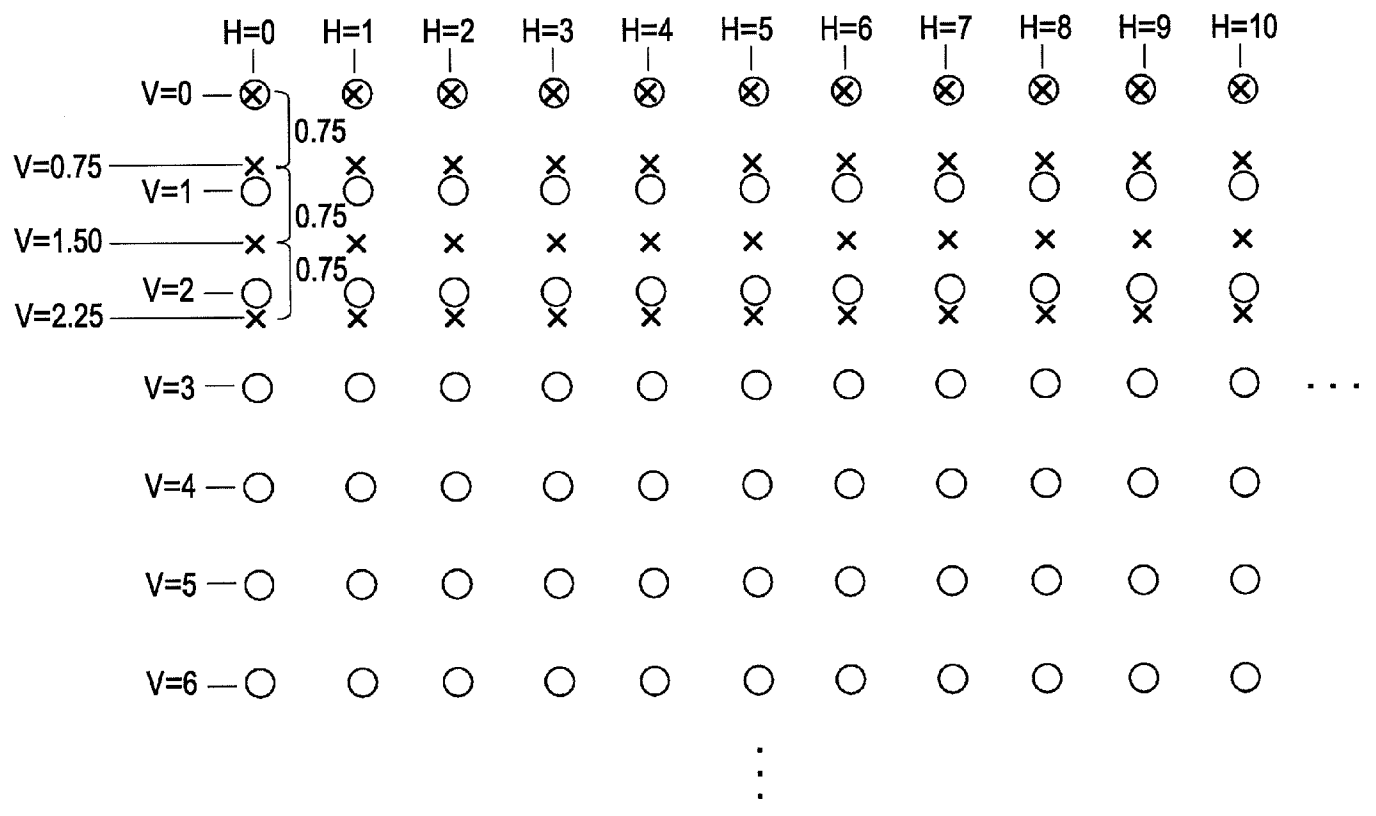
Figure 13:
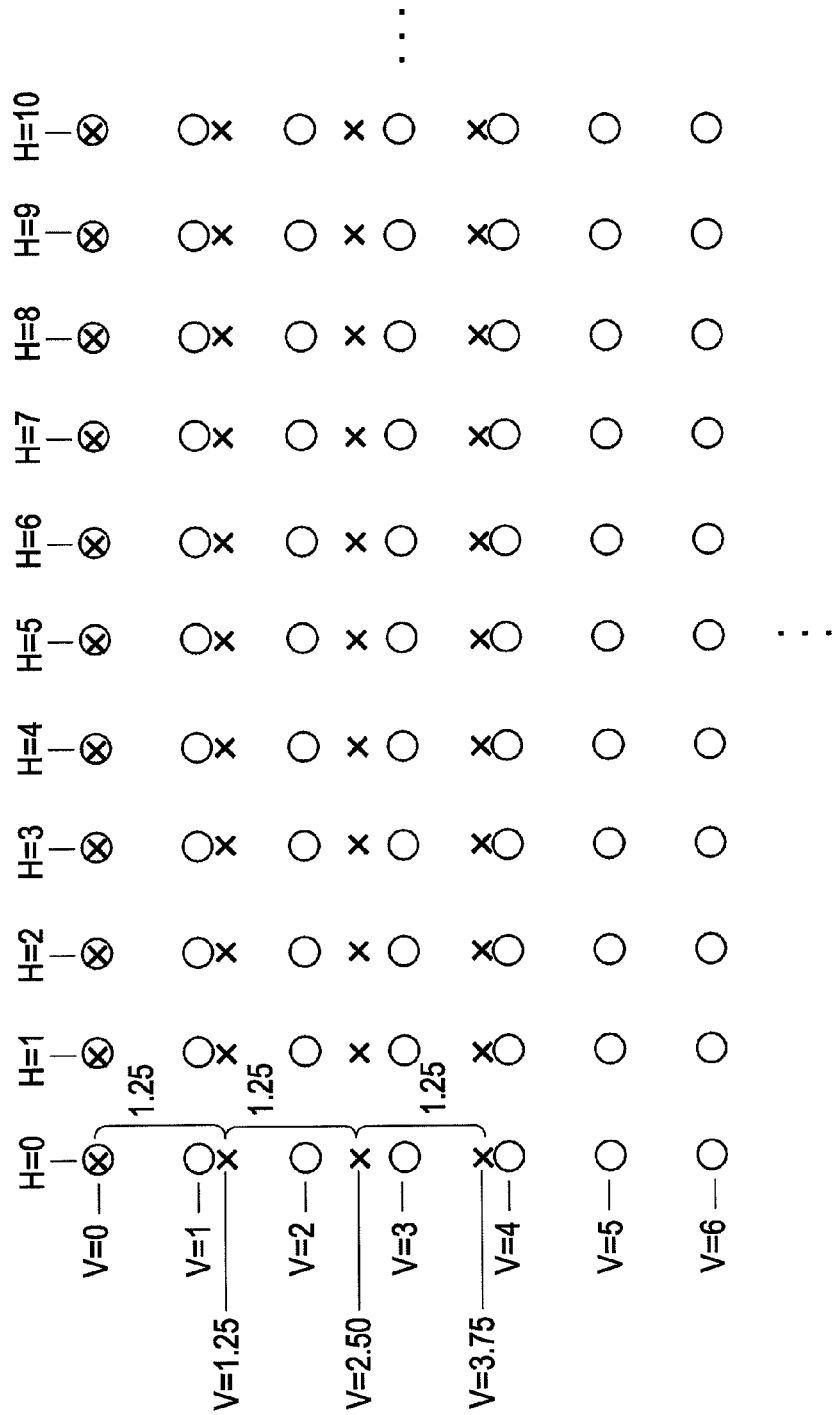
FIG. 13 is a diagram illustrating operations of a vertical resolution transforming process (the number of pixels is decreased and the size of an image is decreased) performed using a vertical transforming unit of a resolution transforming unit according to an embodiment of the present invention.

In FIGS. 12 and 13, "◯" is a pixel position corresponding to each of the pixel signals constituting the left eye image signal SL. In the case that the incremented value of the vertical counter 211a is "1", since the counted values changes in the order of 0, 1, 2, 3 . . . , the pixel signal in the pixel position indicated by "◯" is generated by performing the vertical resolution transforming process. In this case, there is no change in the number of pixels in the vertical direction and hence the image is neither reduced nor enlarged in the vertical direction.

In the case that the incremented value of the vertical counter 211a is smaller than "1", the number of pixels in the vertical direction becomes larger than that obtained for the input left eye image signal SL and hence the image is enlarged in the vertical direction. In FIG. 12, "x" indicates the pixel position of each pixel signal which is generated in the case that the incremented value of the vertical counter 211a is 0.75. In this case, the counted value of the vertical counter 211a changes in the order of 0, 0.75, 1.50, 2.25 . . . and the pixel signals on a vertical line corresponding to the counted value concerned are generated. In this case, since the number of pixels in the vertical direction is increased by 1/0.75=1.33 times the previous value, the image is enlarged by 1.33 times the previous size in the vertical direction.

In the case that the incremented value of the vertical counter 211a is larger than "1", the number of pixels in the vertical direction becomes smaller than that obtained for the input left eye image signal SL and hence the image is reduced in the vertical direction. In FIG. 13, "x" indicates the pixel position of each pixel signal which is generated in the case that the incremented value of the vertical counter 211a is 1.25. In this case, the counted value of the vertical counter 211a changes in the order of 0, 1.25, 2.50, 3.75 . . . and a pixel signal on a vertical line corresponding to the counted value concerned is generated. In this case, since the number of pixels in the vertical direction is decreased by 1/1.25=0.8 times the previous value, the image is reduced by 0.8 times the previous size.

Next, the operations of the horizontal resolution transforming process performed using the horizontal transforming unit 204H will be described with reference to FIGS. 14 and 15.

In the resolution transforming unit 204H, a pixel signal on a vertical line corresponding to the counted value concerned of the horizontal counter 221a is generated every time the pixel clock signal CLK is received by performing the horizontal resolution transforming process. The horizontal counter 221a is incremented every time the pixel clock signal CLK is received as mentioned above. Thus, in the case that the incremented value is "1", the number of pixels in the horizontal direction is the same as that obtained for the input left eye image signal SL and hence the image is neither enlarged nor reduced in the horizontal direction.

Figure 14:
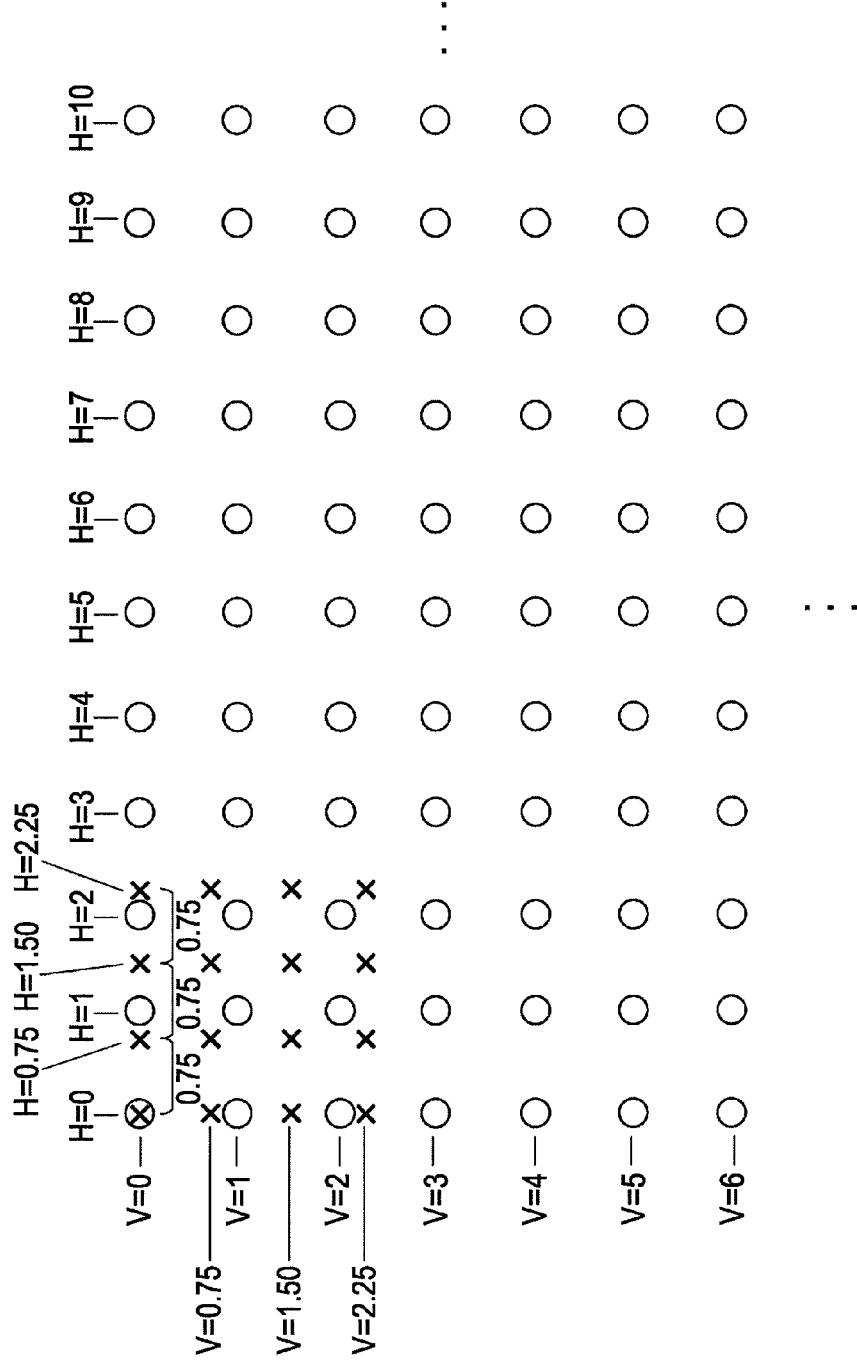
FIG. 14 is a diagram illustrating operations of a horizontal resolution transforming process (the number of pixels is increased and the size of an image is increased) performed using a horizontal transforming unit of a resolution transforming unit according to an embodiment of the present invention.
Figure 15:
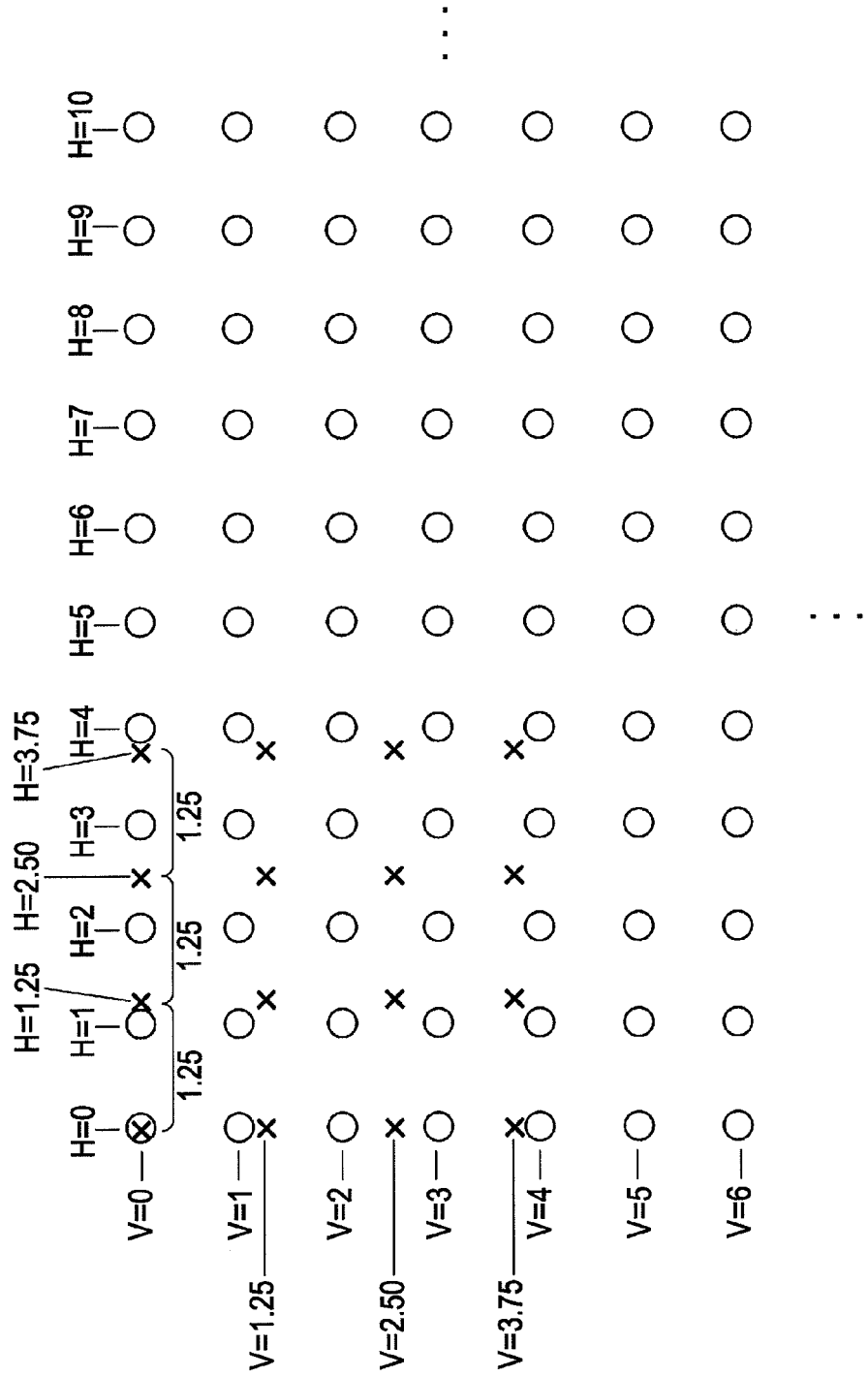
FIG. 15 is a diagram illustrating operations of a horizontal resolution transforming process (the number of pixels is decreased and the size of an image is decreased) performed using a horizontal transforming unit of a resolution transforming unit according to an embodiment of the present invention.

In FIGS. 14 and 15, "○" is a pixel position corresponding to each of the pixel signals constituting the left eye image signal SL. In the case that the incremented value of the horizontal counter 211a is "1", since the counted value changes in the order of 0, 1, 2, 3 . . . , the pixel signal in the pixel position indicated by "○" is generated by performing the horizontal resolution transforming process. In this case, there is no change in the number of pixels in the horizontal direction and hence the image is neither reduced nor enlarged in the horizontal direction.

In the case that the incremented value of the horizontal counter 221a is smaller than "1", the number of pixels in the horizontal direction becomes larger than that obtained for the input left eye image signal SL and hence the image is enlarged in the horizontal direction. In FIG. 14, "x" indicates the pixel position of each pixel signal which is generated in the case that the incremented value of the vertical counter 211a of the vertical control unit 211 as mentioned above is 0.75 and the incremented value of the horizontal counter 221a is 0.75. In this case, the counted value of the horizontal counter 211a changes in the order of 0, 0.75, 1.50, 2.25 . . . and the pixel signal in the horizontal position corresponding to the counted value concerned is generated. In this case, since the number of pixels in the horizontal direction is increased by 1/0.75=1.33 times the previous value, the image is enlarged by 1.33 times the previous size in the horizontal direction.

In the case that the incremented value of the horizontal counter 221a is larger than "1", the number of pixels in the horizontal direction becomes smaller than that obtained for the input left eye image signal SL and hence the image is reduced in the horizontal direction. In FIG. 15, "x" indicates the pixel position of each pixel signal which is generated in the case that the incremented value of the vertical counter 211a of the vertical control unit 211 is 1.25 as described above and the incremented value of the horizontal counter 221a is 1.25. In this case, the counted value of the horizontal counter 211a changes in the order of 0, 1.25, 2.50, 3.75 . . . and a pixel signal in the horizontal position corresponding to the counted value concerned is generated. In this case, since the number of pixels in the horizontal direction is decreased by 1/1.25=0.8 times the previous value, the image is reduced by 0.8 times the previous size in the horizontal direction.

In the case that enlargement or reduction of the left eye image QL has been instructed under the operation of the user, the incremented values of the vertical counter 211a and the horizontal counter 221a are set in accordance with enlargement ratios or reduction ratios concerned. Therefore, the resolution transforming processes are performed using the vertical transforming unit 204V and the horizontal transforming unit 204H in accordance with the enlargement ratios or the reduction ratios concerned to enlarge or reduce the image as described above. Incidentally, the enlargement ratios or the reduction ratios in the vertical and horizontal directions may be set independently of one another. In this case, the incremented values of the vertical counter 211a and the horizontal counter 221a are set to values which are different from each other.

Next, the vertically tilted deforming process performed using the vertical transforming unit 204V will be described with reference to FIGS. 16, 17 and 18. As described above, the correction value which is to be added to the counted value of the vertical counter 211a every time the pixel clock signal CLK is received in the case that the vertically tilted deforming process is to be performed is held in the vertical tilt register 211b. The correction value is set in accordance with a direction in which the left eye image QL (the left eye image PL) is rotated (hereinafter, referred to as a rotation direction) and an amount by which the left eye image is rotated (hereinafter, referred to as a rotation amount).

In the case that the vertically tilted deforming process is performed using the vertical transforming unit 204V in order to rotate the left eye image QL (the left eye image PL), the correction value held in the vertical tilt register 211b is added to the counted value of the vertical counter 211a every time the pixel clock signal CLK is received. The correction values are set as positive or negative values whose absolute values are sequentially increased linearly every time the pixel clock signal CKL is received.

Figure 16:
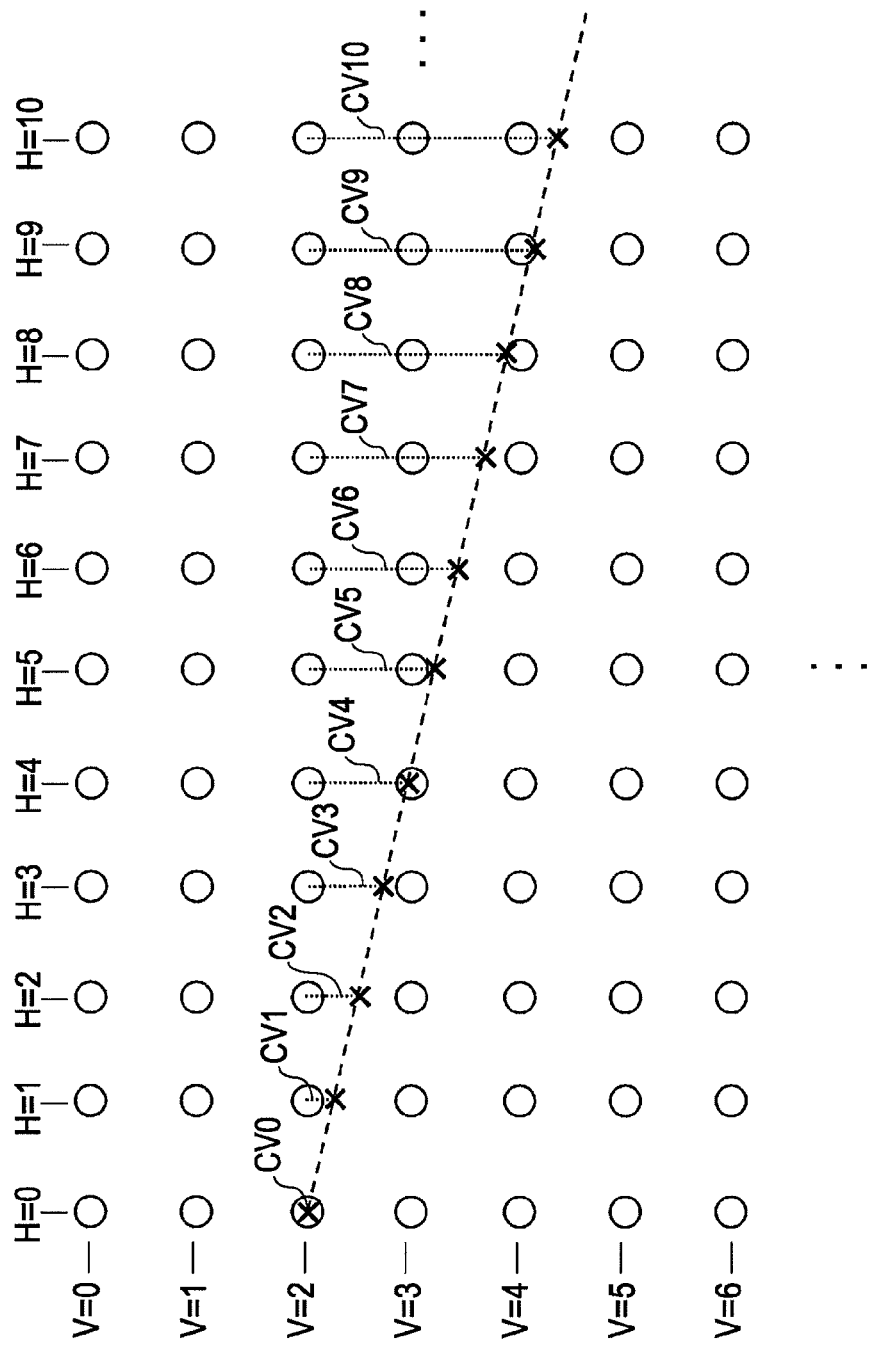
FIG. 16 is a diagram illustrating operations of a vertically tilted deforming process (in the case that the position of a left end is displaced downward and the position of a right end is displaced upward) performed using a vertical transforming unit of a resolution transforming unit according to an embodiment of the present invention.

FIG. 16 shows an example of pixel positions of pixel signals on a certain line which are generated by performing the vertically tilted deforming process in which the position of the left end of an image is displaced downward and the position of the right end thereof is displaced upward using the vertical transforming unit 204V. In the example shown in FIG. 16, each of the positive correction values CV0, CV1, CV2, CV3 . . . whose absolute values are sequentially increased linearly is added to the counted value concerned (in the example shown in FIG. 16, V=2) of the vertical counter 211a every time the pixel clock signal CLK is received, thereby correcting the counted value. Incidentally, CV0=0.

As described above, the vertical control unit 211 selects the plurality of line memories from which pixel signals are to be read out from the line memories 212-1 to 212-N on the basis of the counted value of the vertical counter 211a. Therefore, the pixel positions of pixel signals on a certain line are gradually shifted toward the lower side of an image as the pixel positions come closer to the right side as shown by the symbols "x".

Figure 18A:
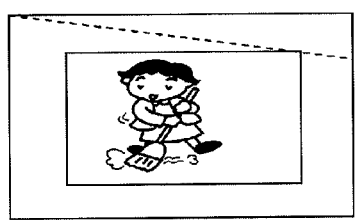
FIG. 18A is a diagram illustrating a vertically tilted deforming process performed using a vertical transforming unit of a resolution transforming unit according to an embodiment of the present invention.
Figure 18B:
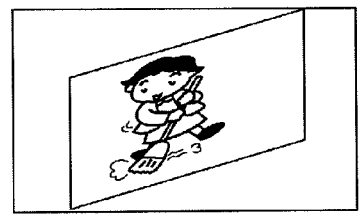
FIG. 18B is a diagram illustrating the vertically tilted deforming process.

In the above mentioned case, the pixel positions of the pixel signals on each line generated using the vertical transforming unit 204V are situated on a straight line which is gradually tilted toward the lower right side relative to the original image formed on the basis of the left eye image signal SL as shown by broken lines in FIG. 18A. Thus, the image formed on the basis of the image signal which has been so processed will be displayed as an image in which the position of the left end is displaced downward and the position of the right end is displaced upward as shown in FIG. 18B.

Figure 17:
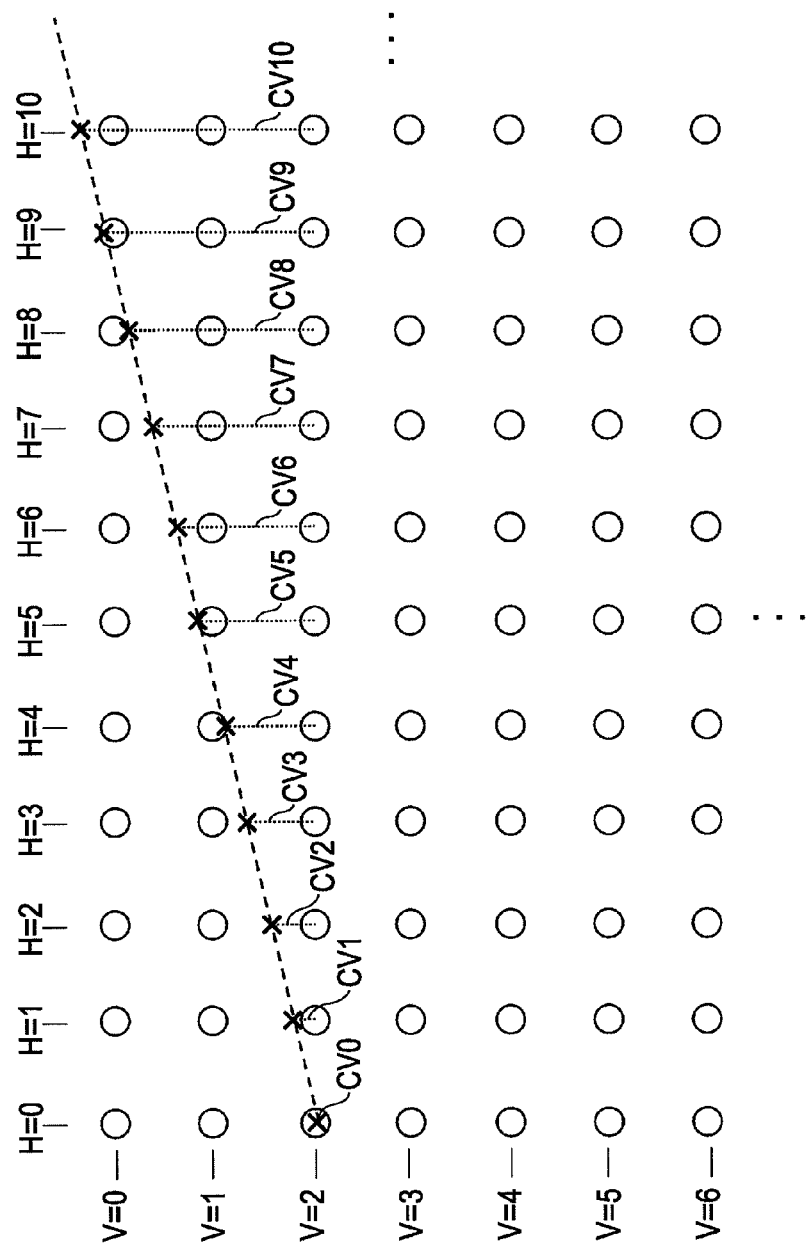
FIG. 17 is a diagram illustrating operations of a vertically tilted deforming process (in the case that the position of the left end is displaced upward and the position of the right end is displaced downward) performed using a vertical transforming unit of a resolution transforming unit according to an embodiment of the present invention.

FIG. 17 shows an example of pixel positions of pixel signals on a certain line which are generated by performing the vertically tilted deforming process in which the position of the left end of an image is displaced upward and the position of the right end thereof is displaced downward using the vertical transforming unit 204V. In the example shown in FIG. 17, each of negative correction values CV0, CV1, CV2, CV3 . . . whose absolute values are sequentially increased linearly is added to the counted value concerned (in the example shown in FIG. 16, V=2) of the vertical counter 211a every time the pixel clock signal CLK is received, thereby correcting the counted value. Incidentally, CV0=0.

As described above, the vertical control unit 211 selects the plurality of line memories from which pixel signals are to be read out from the line memories 212-1 to 212-N on the basis of the counted value of the vertical counter 211a. Therefore, the pixel positions of pixel signals on a certain line are gradually shifted toward the upper side of an image as the pixel positions come closer to the right side as shown by the symbols "x".

Figure 18C:
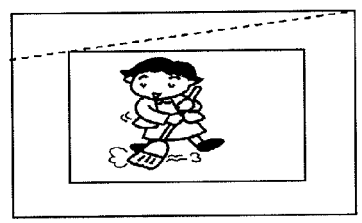
FIG. 18C is a diagram illustrating the vertically tilted deforming process.
Figure 18D:
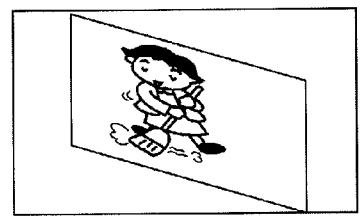
FIG. 18D is a diagram illustrating the vertically tilted deforming process.

In the above mentioned case, the pixel positions of the pixel signals on each line generated using the vertical transforming unit 204V are situated on a straight line which is gradually tilted toward the upper right side relative to the original image formed on the basis of the left eye image signal SL as shown by broken lines in FIG. 18C. Thus, the image formed on the basis of the image signal which has been so processed will be displayed as an image in which the position of the left end is displaced upward and the position of the right end is displaced downward as shown in FIG. 18D.

Next, the horizontally tilted deforming process performed using the horizontal transforming unit 204H will be described with reference to FIGS. 19, 20 and 21. As described above, the correction value which is to be added to the counted value concerned of the horizontal counter 221a every time the horizontal synchronous signal Hsync is received in the case that the horizontally tilted deforming process is to be performed is held in the horizontal tilt register 221b. The correction value is set in accordance with the rotation direction and the rotation amount of the left eye image QL.

In the case that the horizontally tilted deforming process is to be performed using the horizontal transforming unit 204H in order to rotate the left eye image QL, each of the correction values held in the horizontal tilt register 221b is added to the counted value concerned of the horizontal counter 221a every time the horizontal synchronous signal Hsync is received. The correction values are set as positive or negative values whose absolute values are sequentially increased linearly every time the horizontal synchronous signals Hsync is received.

Figure 19:
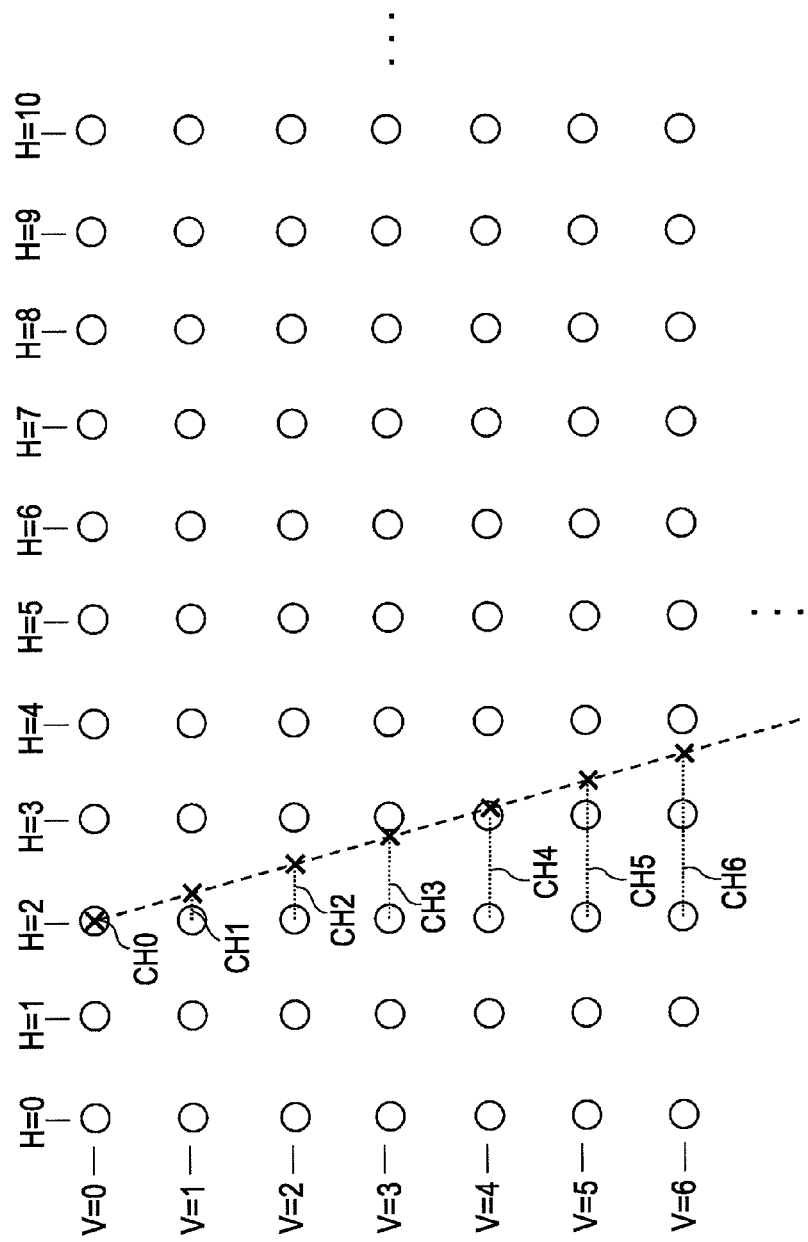
FIG. 19 is a diagram illustrating operations of a horizontally tilted deforming process (in the case that the position of an upper end is displaced rightward and the position of a lower end is displaced leftward) performed using a horizontal transforming unit of a resolution transforming unit according to an embodiment of the present invention.

FIG. 19 shows an example of pixel positions of pixel signals on a certain vertical column which are generated by performing the horizontally tilted deforming process in which the position of the upper end of an image is displaced rightward and the position of the lower end thereof is displaced leftward using the horizontal transforming unit 204H. In the example shown in FIG. 19, each of the positive correction values CH0, CH1, CH2, CH3 . . . whose absolute values are sequentially increased linearly is added to the counted value concerned (in the example shown in FIG. 19, H=2) of the horizontal counter 221a every time the horizontal synchronous signal Hsync is received, thereby correcting the counted value. Incidentally, CV0=0.

The horizontal control unit 221 sets addresses for reading out the pixels signals from the plurality of line memories which have been selected using the vertical control unit 211 in the vertical transforming unit 204V. The counted value of the horizontal counter 211a is corrected every time the horizontal synchronous signal Hsync is received as described above. As a result, the address used to start reading-out of the pixel signals from the plurality of selected line memories is shifted rightward as the column goes downward. Therefore, the pixel positions of pixel signals on a certain vertical column are gradually shifted toward the right side of the image as the column goes downward as shown by the symbols "x".

Figure 21A:
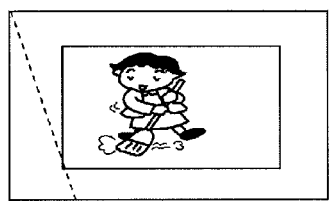
FIG. 21A is a diagram illustrating a horizontally tilted deforming process performed using a horizontal transforming unit of a resolution transforming unit according to an embodiment of the present invention.
Figure 21B:
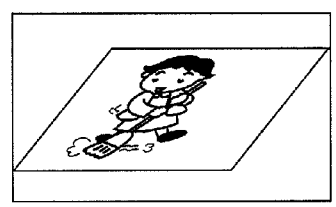
FIG. 21B is a diagram illustrating the horizontally tilted deforming process.

In the above mentioned case, the pixel positions of the pixel signals on each vertical column generated using the horizontal transforming unit 204H are situated on a straight line which is tilted toward the right side relative to the original image formed on the basis of the left eye image signal SL as shown by broken lines in FIG. 21A. Thus, the image formed on the basis of the image signal which has been so processed will be displayed as an image in which the position of the upper end is displaced rightward and the position of the lower end is displaced leftward as shown in FIG. 21B.

FIG. 20 shows an example of pixel positions of pixel signals on a certain vertical column which are generated by performing the horizontally tilted deforming process in which the position of the upper end of an image is displaced leftward and the position of the lower end thereof is displaced rightward using the horizontal transforming unit 204H. In the example shown in FIG. 20, each of negative correction values CH1, CH2, CH3 . . . whose absolute values are sequentially increased linearly is added to the counted value concerned (in the exa shown in FIG. 20, H=2) of the horizontal counter 221a every time the horizontal synchronous signal Hsync is received, thereby correcting the counted value. Incidentally, CH0=0.

As described above, the horizontal control unit 221 sets the addresses for reading out pixel signals from the plurality of line memories which have been selected using the vertical control unit 211 in the vertical transforming unit 204V on the basis of the counted value of the horizontal counter 221a. The counted value of the horizontal counter 211a is corrected every time the horizontal synchronous signal Hsync is received as described above. As a result, the address to start reading-out of the pixel signals from the plurality of selected line memories is shifted leftward as the column goes downward. Therefore, the pixel positions of pixel signals on the vertical column are gradually shifted toward the left side of the image as the column goes downward as shown by the symbols "x".

Figure 21C:
FIG. 21C is a diagram illustrating the horizontally tilted deforming process.
Figure 21D:
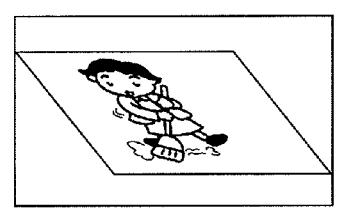
FIG. 21D is a diagram illustrating the horizontally tilted deforming process.

In the above mentioned case, the pixel positions of the pixel signals on each vertical column generated using the horizontal transforming unit 204H are situated on a straight line which is tilted toward the left side relative to the original image formed on the basis of the left eye image signal SL as shown by broken lines in FIG. 21C. Thus, the image formed on the basis of the image signal which has been so processed will be displayed as an image in which the position of the upper end is displaced leftward and the position of the lower end is displaced rightward as shown in FIG. 21D.

In the case that rotation of the left eye image QL (the left eye image PL) has been instructed under the operation of the user, correction values are held in the vertical tilt register 211b and the horizontal tilt register 221b in accordance with the rotation direction and the rotation amount of the left eye image concerned. Then, the counted value of the vertical counter 211a is corrected by adding the correction value held in the vertical tilt register 211b thereto every time the pixel clock signal CLK is received using the vertical transforming unit 204V. Likewise, the counted value held in the horizontal counter 221a is corrected by adding the correction value held in the horizontal tilt register 221b thereto every time the horizontal synchronous signal Hsync is received using the horizontal transforming unit 204H.

Therefore, as described above, the vertically tilted deforming process is performed in accordance with the rotation direction and the rotation amount of the left eye image concerned using the vertical transforming unit 204V. Likewise, the horizontally tilted deforming process is performed in accordance with the rotation direction and the rotation amount of the left eye image concerned using the horizontal transforming unit 204H. As a result of performance of the vertically tilted deforming process and the horizontally tilted deforming process in the above mentioned manner, the image is rotated (see FIGS. 10 and 11) as described above.

As described above, in the image projecting device shown in FIG. 1, the projector 200 is configured to perform the transforming process for rotating the left eye image QL (the left eye image PL) and the transforming process for rotating the right eye image QR (the right eye image PR) using the resolution transforming unit 204. Therefore, it may become possible to correct the displacement in display position between the left and right eye images induced by rotation of the images generated in the case the left eye image QL and the right eye image QR which have been displayed on the liquid crystal panel 201 are displayed in the superposed state on the screen 400 using the projection optical system 300.

Modified Example

In the above mentioned embodiments of the present invention, the images are rotated by performing the vertically tilted deforming process and the horizontally tilted deforming process on the image signals using the resolution transforming unit 204 of the projector 200. However, the present invention is not limited thereto and the images may be rotated by performing processes other than the above on the image signals. For example, the image signals may be transformed on the basis of the equation for coordinate transformation (see the numerical formula (1)).

The embodiments of the present invention may be applied, for example, to a stereoscopic image projecting device configured such that a left eye image and a right eye image are simultaneously displayed on a liquid crystal panel in a line and the images are displayed on a screen in a superposed state using a projection optical system.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing device comprising:
a vertical control unit having a vertical counter and a vertical tilt register, wherein a first correction value is stored in the vertical tilt register and added to the vertical counter when a vertically tilted transforming process is performed;
a horizontal control unit having a horizontal counter and a horizontal tilt register, wherein a second correction value is stored in the horizontal tilt register and added to the horizontal counter when a horizontally tilted transforming process is performed;
a first transforming process unit configured to perform a transforming process for rotating a left eye image on a left eye image signal used to display the left eye image as pixels each having rectangular coordinates x and y based on the first correction value and the second correction value;
a second transforming process unit configured to perform a transforming process for rotating a right eye image on a right eye image signal used to display the right eye image as pixels each having rectangular coordinates $x_1$ and $y_1$;
a projector unit configured to project the left eye image signal obtained by being subjected to the transforming process performed using the first transforming process unit with first linearly polarized light and the right eye image signal obtained by being subjected to the transforming process performed using the second transforming process unit with second linearly polarized light superposed upon one another to obtain an output image signal, the projected left eye image and projected right eye image displayed on a display device; and
a resolution transforming unit configured to perform a transforming process for rotating a selected one of the displayed left eye image or the displayed right eye image displayed under the instruction of a user,
wherein the unselected left eye image or right eye image is automatically rotated an equivalent amount in a direction opposite to that of the image whose rotation has been instructed from the user,
wherein when the left eye image is selected for resolution transforming then the resolution transforming unit transforms coordinates x and y to display coordinates X and Y, respectively, according to the formula:

$$\begin{bmatrix} X \\ Y \end{bmatrix} = \begin{bmatrix} 1 & a \\ 0 & 1 \end{bmatrix} \begin{bmatrix} x \\ y \end{bmatrix}$$

where a is less than or equal to 4 pixels/1000 pixels.

2. The image signal processing device according to claim 1, wherein
each of the first and second transforming process units has a first deforming process unit configured to perform a vertically tilted deforming process and a second deforming process unit configured to perform a horizontally tilted deforming process so as to perform a process for rotating the images by performing the vertically tilted deforming process and the horizontally tilted deforming process.

3. An image signal processing method comprising the steps of:
storing a first correction value in a vertical tilt register, the first correction value being added to a vertical counter when a vertically tilted transforming process is performed;
storing a second correction value in a horizontal tilt register, the second correction value being added to a horizontal counter when a horizontal tilted transforming process is performed;
performing a first transforming process for rotating a left eye image on a left eye image signal used to display the left eye image as pixels each having rectangular coordinates x and y based on the first correction value and the second correction value;
performing a second transforming process for rotating a right eye image on a right eye image signal used to display the right eye image as pixels each having rectangular coordinates $x_1$ and $y_1$; and
projecting the left eye image signal obtained by being subjected to the transforming process at the first transforming process step with first linearly polarized light and the right eye image signal obtained by being subjected to the transforming process at the second transforming process step with second linearly polarized light superposed upon one another to obtain an output image signal;
displaying the projected left eye image and projected right eye image displayed on a display device; and
rotating a selected one of the displayed left eye image or the right eye image displayed under the instruction of a user, wherein the unselected left eye image or right eye image is automatically rotated an equivalent amount in a direction opposite to that of the image whose rotation has been instructed from the user, wherein when the left eye image is selected for resolution transforming then the resolution transforming unit transforms coordinates x and y to display coordinates X and Y, respectively, according to the formula:

$$\begin{bmatrix} X \\ Y \end{bmatrix} = \begin{bmatrix} 1 & a \\ 0 & 1 \end{bmatrix} \begin{bmatrix} x \\ y \end{bmatrix}$$

where a is less than or equal to 4 pixels/1000 pixels.

4. An image projecting device comprising:
a vertical control unit having a vertical counter and a vertical tilt register, wherein a first correction value is stored in the vertical tilt register and added to the vertical counter when a vertically tilted transforming process is performed;
a horizontal control unit having a horizontal counter and a horizontal tilt register, wherein a second correction value is stored in the horizontally tilt register and added to the horizontal counter when a horizontally tilted transforming process is performed;
an image display unit configured to simultaneously display a left eye image as pixels each having rectangular coordinates x and y based on the first correction value and the second correction value and a right eye image as pixels each having rectangular coordinates $x_1$ and $y_1$ in a line on a display panel; and
a projection optical system configured to project the left eye image and the right eye image which have been displayed on the display panel onto a screen in a superposed state, wherein the image display unit has
a first transforming process unit configured to perform a transforming process for rotating the left eye image on a left eye image signal used to display the left eye image;
a second transforming process unit configured to perform a transforming process for rotating the right eye image on a right eye image signal used to display the right eye image; and
a projecting unit configured to project the left eye image signal obtained by being subjected to the transforming process performed using the first transforming process unit with first linearly polarized light and the right eye image signal obtained by being subjected to the transforming process performed using the second transforming process unit with second linearly polarized light superposed upon one another to obtain an image signal for display use, the projected left eye image and projected right eye image displayed on a display device; and
a resolution transforming unit configured to perform a transforming process for rotating a selected one of the displayed left eye image or rotating the right eye image displayed under the instruction of a user,
wherein the unselected left eye image or right eye image is automatically rotated an equivalent amount in a direction opposite to that of the image whose rotation has been instructed from the user,
wherein when the left eye image is selected for resolution transforming then the resolution transforming unit transforms coordinates x and y to display coordinates X and Y, respectively, according to the formula:

$$\begin{bmatrix} X \\ Y \end{bmatrix} = \begin{bmatrix} 1 & a \\ 0 & 1 \end{bmatrix} \begin{bmatrix} x \\ y \end{bmatrix}$$

where a is less than or equal to 4 pixels/1000 pixels.

5. The image projecting device according to claim 4, wherein the projection optical system has
a relay lens upon which a light ray from the left eye image displayed on the display panel and a light ray from the right eye image displayed on the display panel are incident to form a real image of the left eye image and a real image of the right eye image which are separated from each other;
a light guiding unit configured to separately guide the real image of the left eye image formed using the relay lens and the real image of the right eye image formed using the relay lens;
a first projection lens configured to project the real image of the left eye image which has been guided using the light guiding unit onto the screen; and
a second projection lens configured to project the real image of the right eye image which has been guided using the light guiding unit onto the screen.

* * * * *